(12) United States Patent
Ely et al.

(10) Patent No.: US 9,373,463 B2
(45) Date of Patent: Jun. 21, 2016

(54) SYSTEMS AND METHODS FOR PROVIDING INPUTS TO AN ELECTRONIC DEVICE WITH A BUTTON ASSEMBLY

(75) Inventors: Colin M. Ely, Cupertino, CA (US); Fletcher R. Rothkopf, Mountain View, CA (US); Stephen Brian Lynch, Portola Valley, CA (US); Christopher Matthew Werner, San Jose, CA (US)

(73) Assignee: APPLE INC., Cupertino, CA (US)

( * ) Notice: Subject to any disclaimer, the term of this patent is extended or adjusted under 35 U.S.C. 154(b) by 393 days.

(21) Appl. No.: 13/610,676

(22) Filed: Sep. 11, 2012

(65) Prior Publication Data

US 2014/0069790 A1    Mar. 13, 2014

(51) Int. Cl.
*H01H 13/70* (2006.01)
*H01H 13/14* (2006.01)
*H01H 11/00* (2006.01)
*H01H 13/64* (2006.01)
*H01H 13/7057* (2006.01)
*H01H 13/705* (2006.01)
*H04M 1/23* (2006.01)

(52) U.S. Cl.
CPC .............. *H01H 13/14* (2013.01); *H01H 11/00* (2013.01); *H01H 13/64* (2013.01); *H01H 13/70* (2013.01); *H01H 13/705* (2013.01); *H01H 13/7057* (2013.01); *H04M 1/236* (2013.01); *H01H 2217/004* (2013.01); *H01H 2217/01* (2013.01); *H01H 2221/078* (2013.01); *H01H 2225/01* (2013.01); *Y10T 29/49002* (2015.01)

(58) Field of Classification Search
CPC . H01H 13/64; H01H 13/66; H01H 2221/078; H01H 13/7057; H01H 2225/01
USPC ..... 200/5 R, 5 E, 17 R, 50.36, 341, 553, 556, 200/339
See application file for complete search history.

(56) References Cited

U.S. PATENT DOCUMENTS

| | | | | |
|---|---|---|---|---|
| 5,584,380 A | * | 12/1996 | Naitou | 200/315 |
| 6,963,039 B1 | * | 11/2005 | Weng et al. | 200/302.1 |
| 6,967,300 B1 | * | 11/2005 | Mizuno et al. | 200/512 |
| 7,019,225 B2 | * | 3/2006 | Matsumoto et al. | 200/5 R |
| 7,705,255 B2 | * | 4/2010 | Yokote | 200/302.2 |
| 7,863,533 B2 | * | 1/2011 | Hamel et al. | 200/5 R |
| 8,124,903 B2 | * | 2/2012 | Tatehata et al. | 200/512 |
| 2012/0018291 A1 | * | 1/2012 | Wang | 200/5 R |

* cited by examiner

*Primary Examiner* — Felix O Figueroa
(74) *Attorney, Agent, or Firm* — Brownstein Hyatt Farber Schreck, LLP

(57) ABSTRACT

This is directed to systems and methods for providing inputs to an electronic device with a button assembly. The button assembly may include a center region, a first end region that may extend from a first side of the center region, and a second end region that may extend from a second side of the center region. Each one of the first end region and the second end region may include a first flexibility, and the center region may include a second flexibility that may be less than the first flexibility.

30 Claims, 12 Drawing Sheets

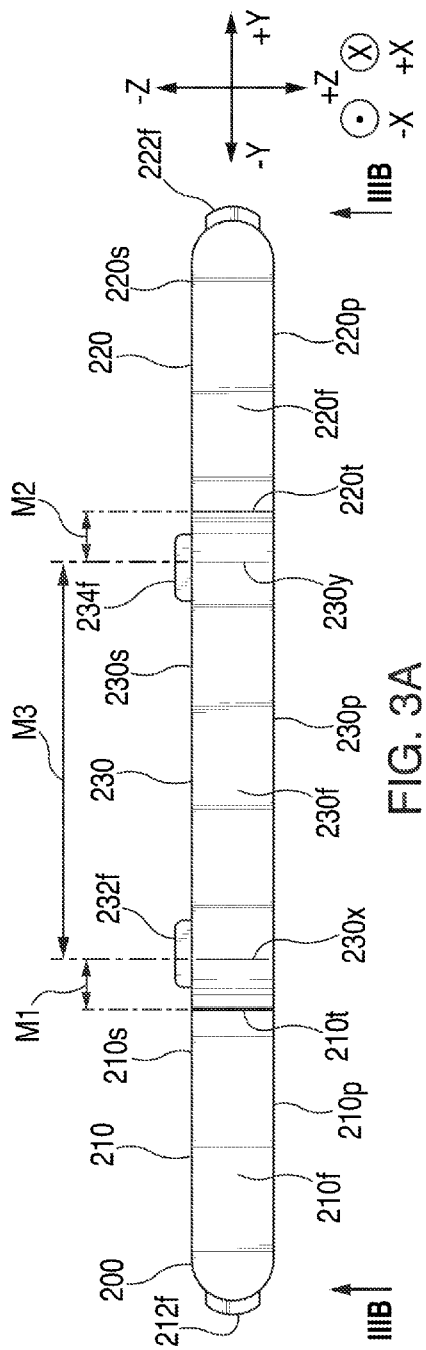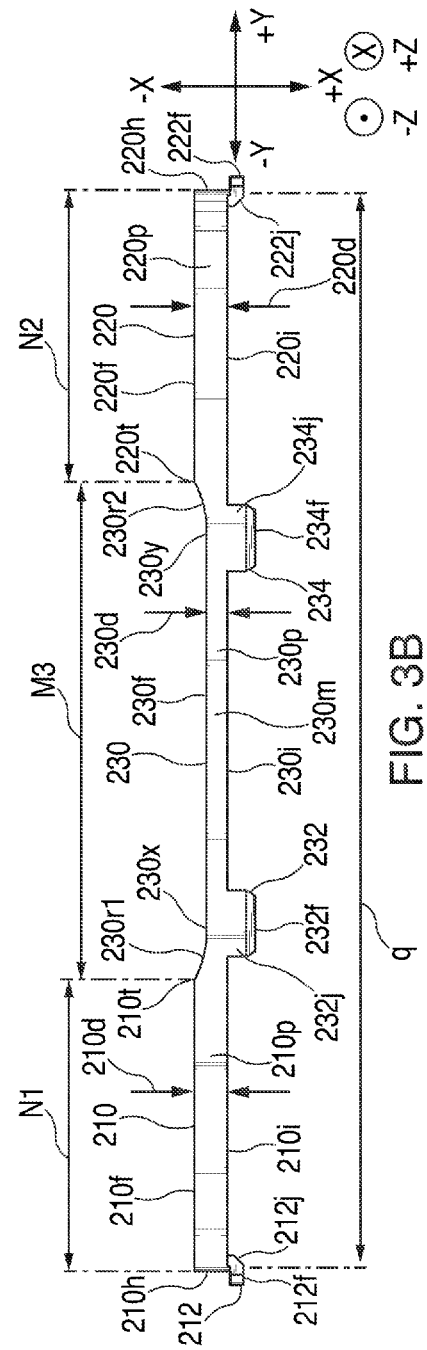

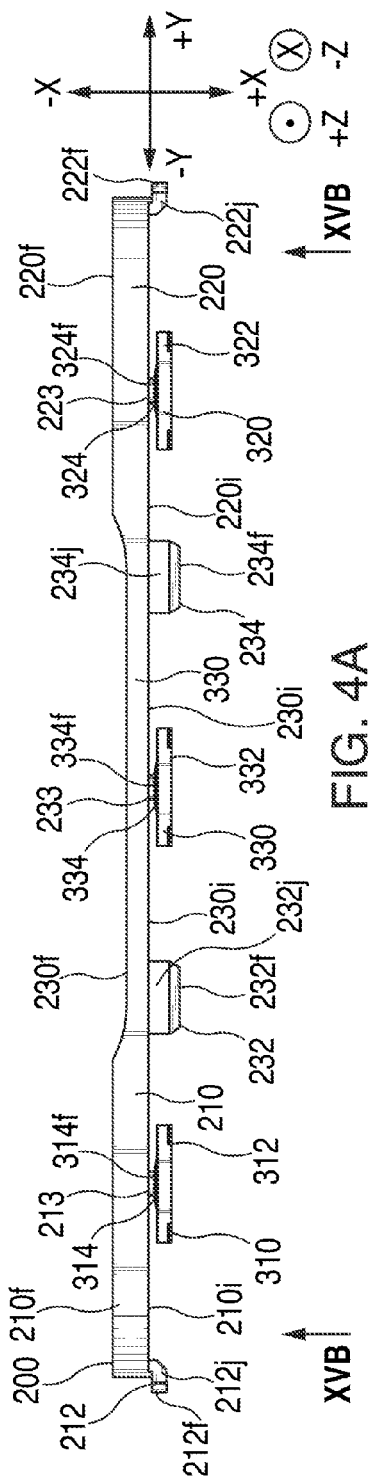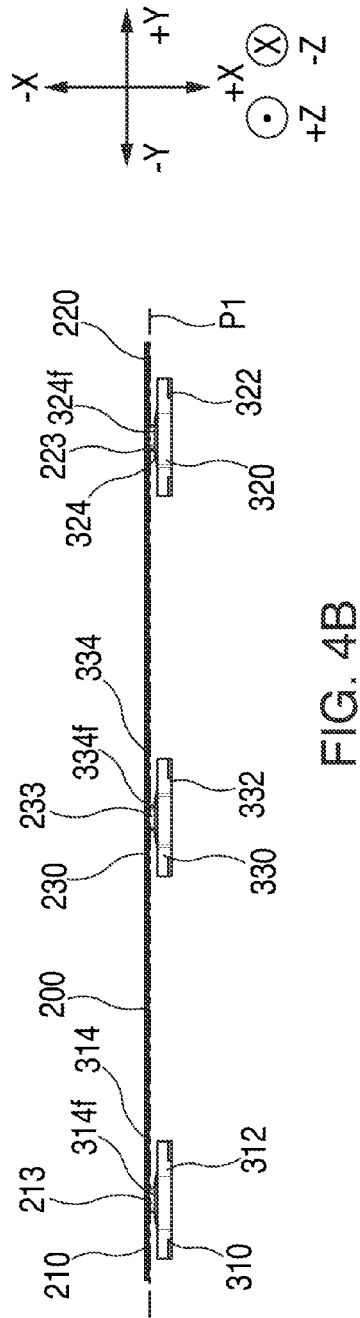

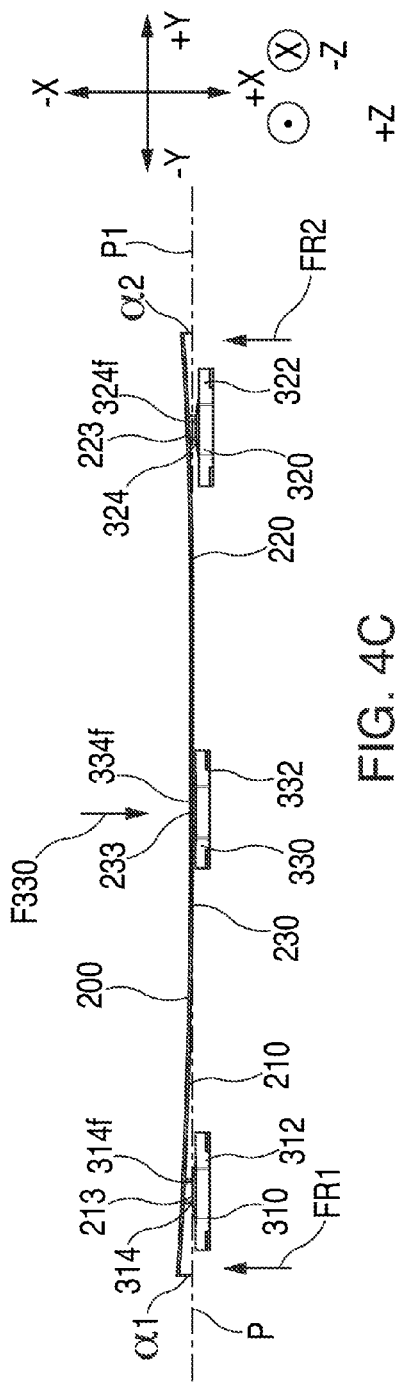
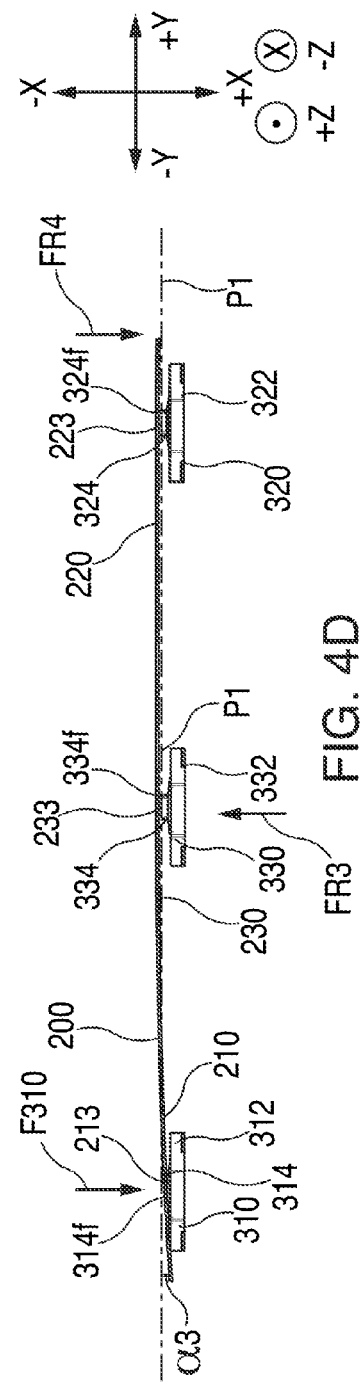
FIG. 4C
FIG. 4D

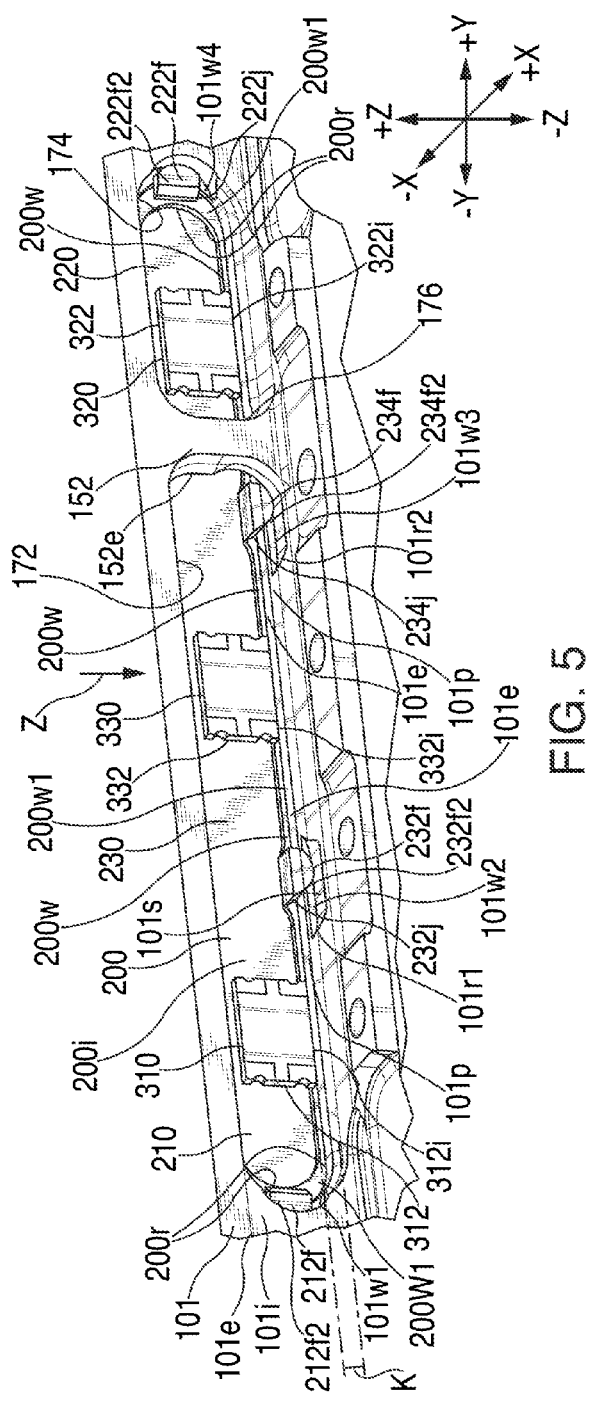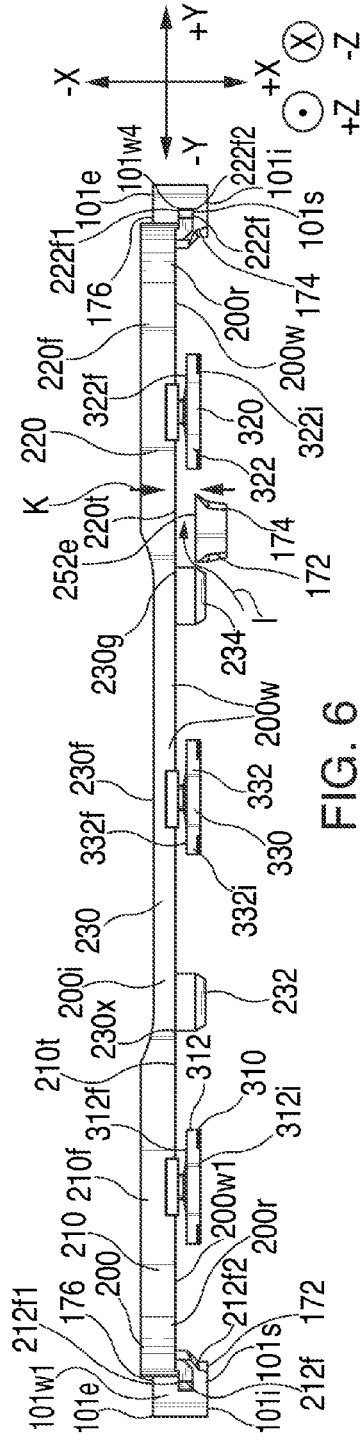

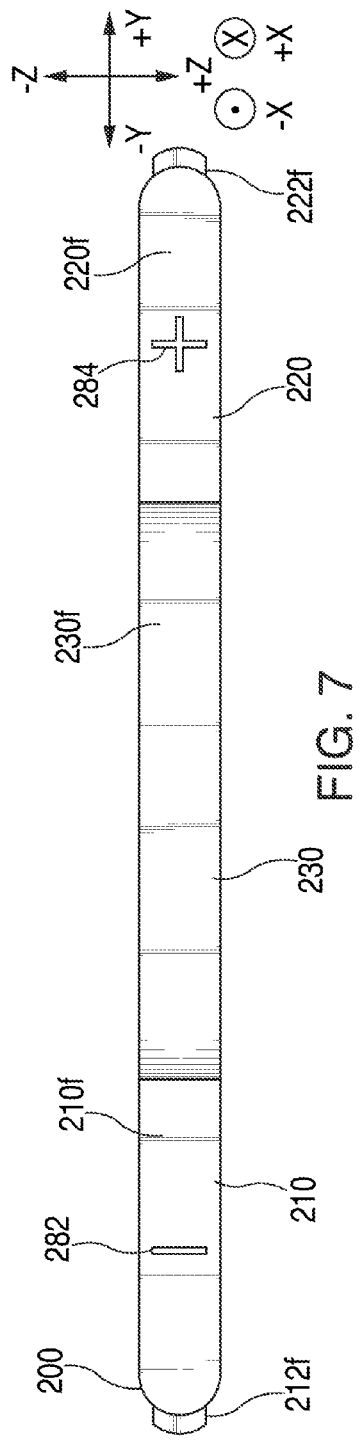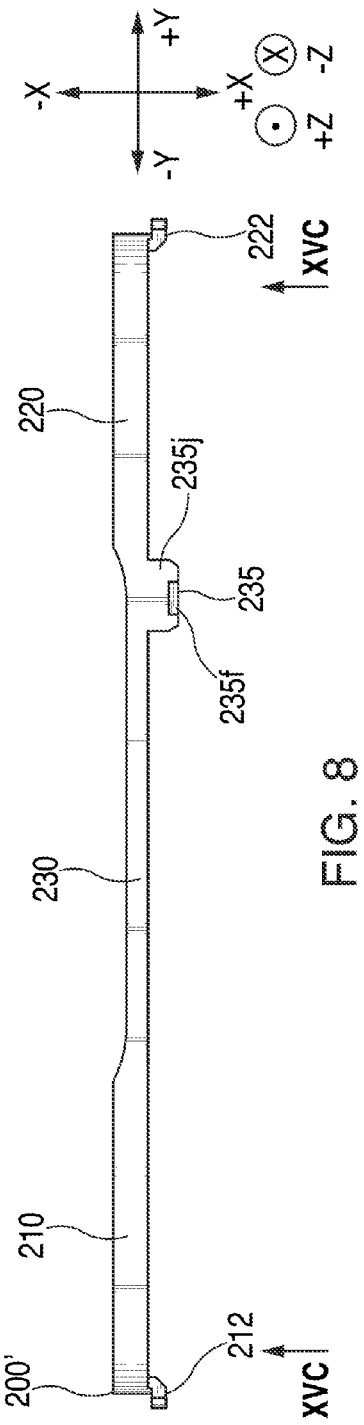

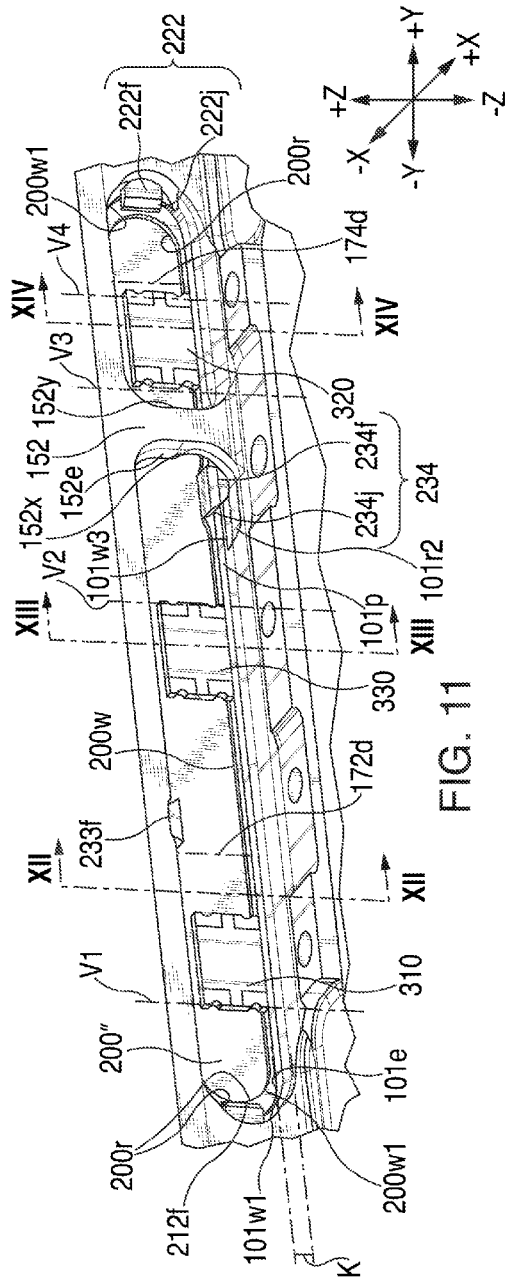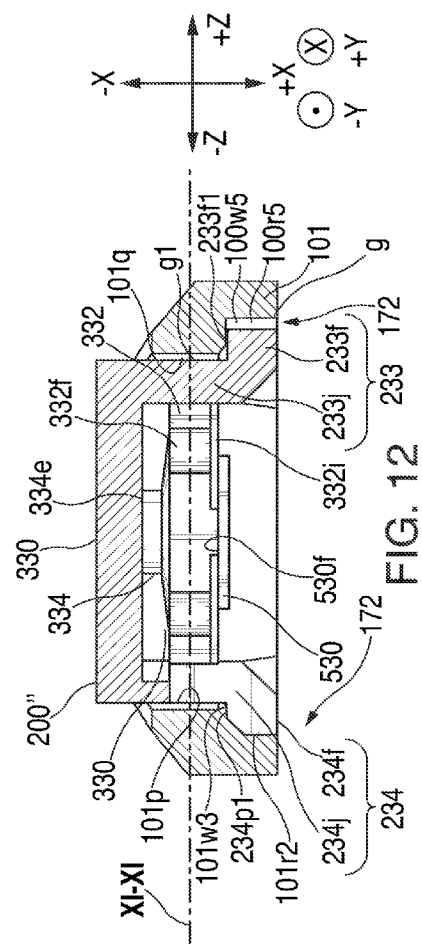

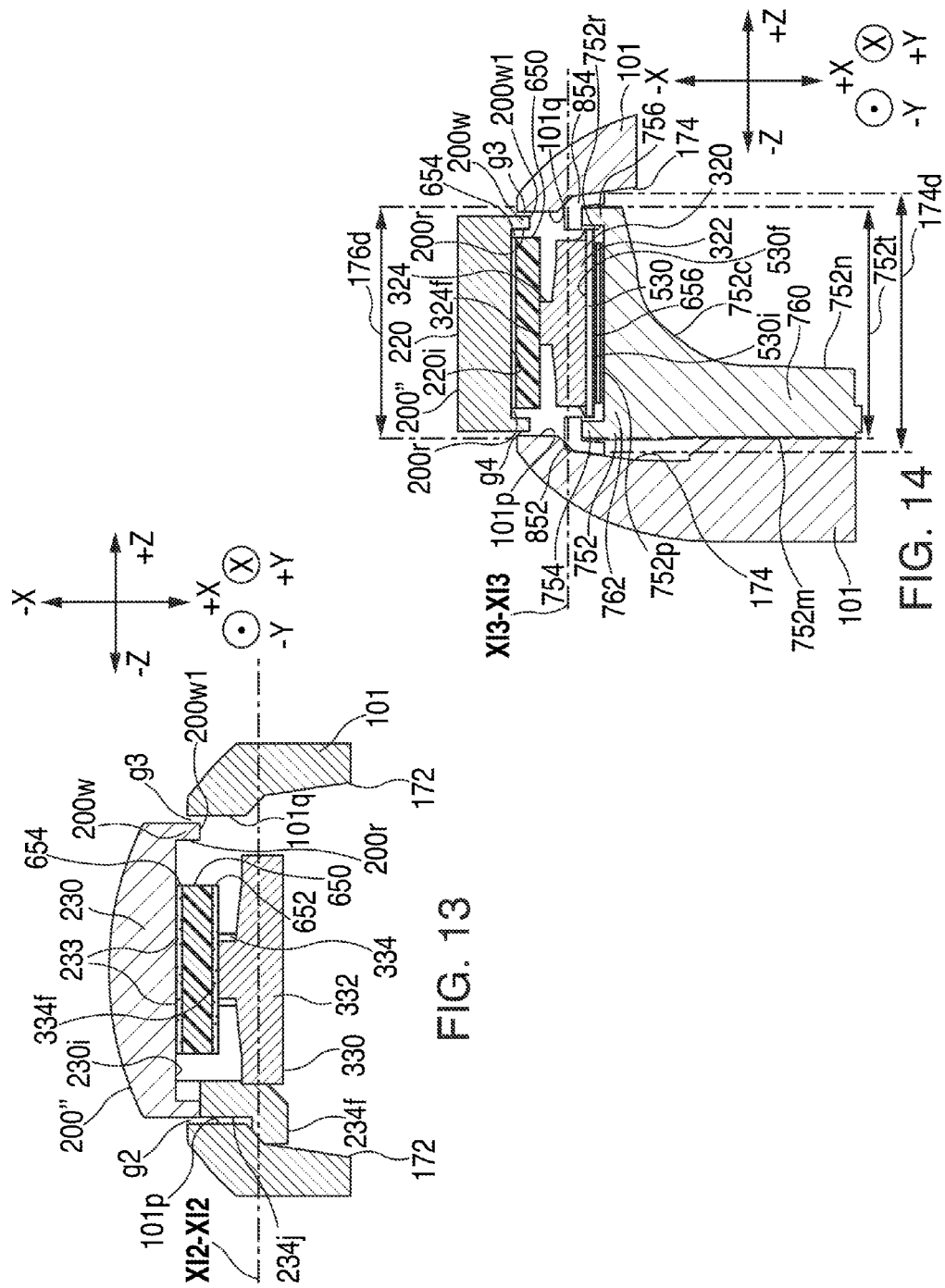

SYSTEMS AND METHODS FOR PROVIDING INPUTS TO AN ELECTRONIC DEVICE WITH A BUTTON ASSEMBLY

FIELD OF THE INVENTION

This can relate to systems and methods for providing inputs to an electronic device and, more particularly, to systems and methods for providing inputs to an electronic device with a button assembly.

BACKGROUND OF THE DISCLOSURE

Many electronic devices include mechanisms for entering inputs. For example, an electronic device typically includes one or more buttons, such as a power button, one or more volume control buttons, and various other buttons for entering inputs to the electronic device. However, each one of these buttons may add to a total part count of the electronic device. Moreover, each button may be different in at least one of size, shape, material, and manufacturing requirements, which may increase manufacturing time and costs of the electronic device.

SUMMARY OF THE DISCLOSURE

Systems and methods for providing inputs to an electronic device with a button assembly are provided.

In some embodiments, a button assembly may be provided. The button assembly may include a center region, a first end region extending from a first side of the center region, and a second end region extending from a second side of the center region. Each one of the first end region and the second end region may include a first flexibility. The center region may include a second flexibility that is less than the first flexibility.

In some embodiments, an electronic device may be provided. The electronic device may include a housing, a set of switches disposed within the housing, and a button positioned to interact with a portion of the housing and including a set of regions. Each region of the set of regions may be positioned adjacent to a respective switch of the set of switches. The button may be configured to move in a first manner with respect to the set of switches when an external force is applied to a first region of the set of regions. The button may also be configured to move in a second manner with respect to the set of switches when the external force is applied to a second region of the set of regions.

In some embodiments, an electronic device may be provided. The electronic device may include a switch, a button, and a shim disposed between a portion of the button and a portion of the switch. The shim may be coupled to the portion of the button via a first adhesive member. The shim may also be coupled to the portion of the switch via a second adhesive member.

In some embodiments, an electronic device may be provided. The electronic device may include a housing, a button positioned to interact with a portion of the housing, and a bracket including an arm portion and a hand portion. The electronic device may also include a set of switches residing on the hand portion and disposed adjacent to the button. The bracket may be configured to prevent each switch of the set of switches from moving away from the button in a first direction.

In some embodiments, a method of integrating a button assembly with an electronic device may be provided. The button assembly may include a first end region, a second end region, and a center region disposed between the first end region and the second end region. The electronic device may include a housing. The method may include positioning the button assembly within the housing. After the positioning, the method may also include bending at least a portion of the center region around a portion of a structural post of the housing. After the bending, the method may also include aligning the first end region with a first structural component of the housing. The method may also include interfacing a limb of the first end region to the first structural component based on the aligning. After the interfacing, the method may also include displacing the second end region towards a second structural component of the housing. Based on the displacing, the method may also include interfacing a limb of the second end region to the second structural component.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIG. 3A is a top view of the button assembly of FIGS. 2A and 2B, in accordance with some embodiments of the invention;

FIG. 3B is a side view of the button assembly of FIGS. 2A-3A, taken from line IIIB-IIIB of FIG. 3A, in accordance with some embodiments of the invention;

FIG. 4A is side view, similar to FIG. 3B, of the button assembly of FIGS. 2A-3B and a set of switches, in accordance with some embodiments of the invention;

FIG. 4B is a side view, similar to FIG. 4A, of a simplified representation of the button assembly of FIGS. 2A-4A and the set of switches of FIG. 4A, the combination of the button assembly and the set of switches being in a first configuration, in accordance with some embodiments of the invention;

FIG. 4C is a side view, similar to FIG. 4A, of a simplified representation of the button assembly of FIGS. 2A-4B and the set of switches of FIGS. 4A and 4B, the combination of the button assembly and the set of switches being in a second configuration, in accordance with some embodiments of the invention;

FIG. 4D is a side view, similar to FIG. 4B, of a simplified representation of the button assembly of FIGS. 2A-4A and the set of switches of FIGS. 4A-4C, the combination of the button assembly and the set of switches being in a third configuration, in accordance with some embodiments of the invention;

FIG. 5 is a perspective view of a portion of the electronic device of FIGS. 1-2B, the portion including the button assembly of FIGS. 2A-4A and the set of switches of FIGS. 4A-4C, in accordance with some embodiments of the invention;

FIG. 6 is a side view, similar to FIG. 3B, of the portion of the electronic device of FIG. 5, in accordance with some embodiments of the invention;

FIG. 7 is a top view, similar to FIG. 3A, of the button assembly of FIGS. 2A-4A, 5, and 6, the button assembly including markings, in accordance with some embodiments of the invention;

FIG. 8 is a side view, similar to FIG. 3B, of a first alternative button assembly, similar to the button assembly of FIGS. 2A-4A and 5-7, in accordance with some embodiments of the invention;

FIG. 11 is a perspective view, similar to FIG. 9, of the portion of the electronic device of FIGS. 5 and 9, the portion including the second alternative button assembly of FIG. 10 and the set of switches of FIGS. 4A-6 and 9, in accordance with some embodiments of the invention;

FIG. 12 is a partial cross-sectional view of the portion of the electronic device of FIG. 11, taken from line XII-XII of FIG. 11, in accordance with some embodiments of the invention;

FIG. 13 is a partial cross-sectional view, similar to FIG. 12, of the portion of the electronic device of FIG. 11, taken from line XIII-XIII of FIG. 11, in accordance with some embodiments of the invention;

FIG. 14 is a partial cross-sectional view, similar to FIGS. 12 and 13, of the portion of the electronic device of FIG. 11, taken from line XIV-XIV of FIG. 11, in accordance with some embodiments of the invention;

DETAILED DESCRIPTION OF THE DISCLOSURE

Systems and methods for providing inputs to an electronic device with a button assembly are provided and described with reference to FIGS. 1-16.

Figure 1:
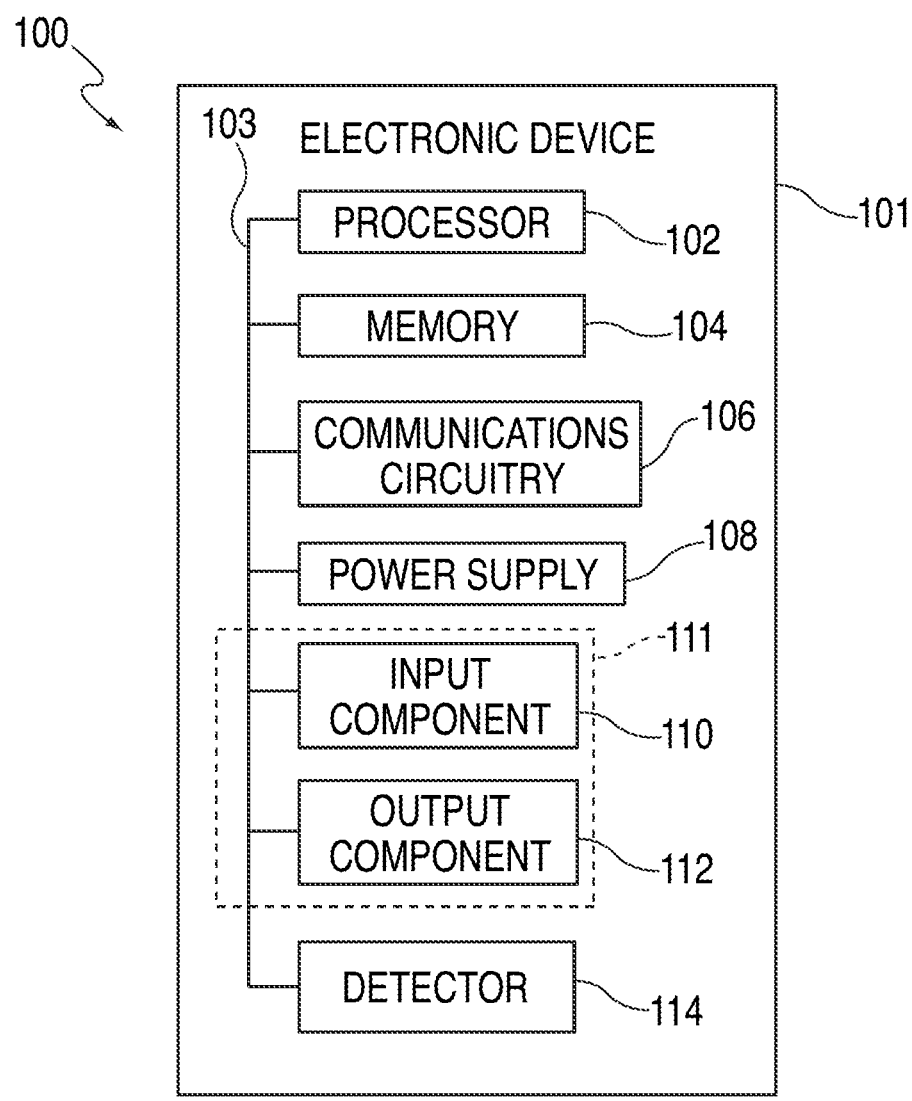
FIG. 1 is a schematic view of an illustrative electronic device, in accordance with some embodiments of the invention.

FIG. 1 is a schematic view of an illustrative electronic device 100. In some embodiments, electronic device 100 may perform a single function (e.g., a device dedicated to storing image content) and, in other embodiments, electronic device 100 may perform multiple functions (e.g., a device that stores image content, plays music, and receives and transmits telephone calls). Moreover, in some embodiments, electronic device 100 may be any portable, mobile, or hand-held electronic device configured to control output of content. Alternatively, electronic device 100 may not be portable at all, but may instead be generally stationary. Electronic device 100 may include any suitable type of electronic device operative to receive user inputs. For example, electronic device 100 may include a media player (e.g., an iPod™ available by Apple Inc. of Cupertino, Calif.), a cellular telephone (e.g., an iPhone™ available by Apple Inc.), a personal e-mail or messaging device (e.g., a Blackberry™ available by Research In Motion Limited of Waterloo, Ontario), any other wireless communication device, a pocket-sized personal computer, a personal digital assistant ("PDA"), a tablet, a laptop computer, a desktop computer, a music recorder, a still camera, a movie or video camera or recorder, a radio, medical equipment, an accessory (e.g., headphones), any other suitable type of electronic device, and any combinations thereof.

Electronic device 100 may include a processor or control circuitry 102, memory 104, communications circuitry 106, power supply 108, input component 110, output component 112, and a detector 114. Electronic device 100 may also include a bus 103 that may provide a transfer path for transferring data and/or power, to, from, or between various other components of device 100. In some embodiments, one or more components of electronic device 100 may be combined or omitted. Moreover, electronic device 100 may include other components not combined or included in FIG. 1. For example, electronic device 100 may include motion detection circuitry, light sensing circuitry, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the other components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard, volume control buttons, etc.), mouse, joy stick, track ball, a microphone, and combinations thereof. For example, input component 110 may include a multi-touch screen. Each input component 110 can be configured to provide one or more dedicated control functions for making selections or issuing commands associated with operating device 100.

Electronic device 100 may also include one or more output components 112 that may present information (e.g., textual, graphical, audible, and/or tactile information) to a user of device 100. Output component 112 of electronic device 100 may take various forms, including, but not limited, to audio speakers, in-ear earphones, headphones, audio line-outs, visual displays, antennas, infrared ports, rumblers, vibrators, or combinations thereof.

In some embodiments, output component 112 may include an audio output module that may be coupled to an audio connector (e.g., a male audio jack) for interfacing with an audio device (e.g., a headphone, an in-ear earphone, a microphone, etc.).

It should be noted that one or more input components 110 and one or more output components 112 may sometimes be referred to collectively herein as an I/O interface (e.g., input component 110 and output component 112 as I/O interface 111). It should also be noted that input component 110 and output component 112 may sometimes be a single I/O component, such as a touch screen that may receive input information through a user's touch of a display screen and that may also provide visual information to a user via that same display screen.

Detector 114 may include one or more sensors of any suitable type that may be utilized to detect a condition of the environment of device 100. In some embodiments, detector 114 may also include one or more sensors that may detect any human feature or characteristic (e.g., physiological, psychological, physical, movement, etc.). For example, detector 114 may include a microphone for detecting voice signals from one or more individuals. As another example, detector 114 may include a heartbeat sensor for detecting heartbeats of one or more individuals. As yet other examples, detector 114 may include a fingerprint reader, an iris scanner, a retina scanner, a breath sampler, and a humidity sensor that may detect moisture and/or sweat emanating from any suitable portion of an individual's body. For example, detector 114 may include a humidity sensor that may be situated near or coupled to one or more portions of input component 110, and that may detect moisture and/or sweat from an individual's hands. It should be appreciated that any detector 114 may include any sensor that may detect any human feature or characteristic.

In some embodiments, detector 114 may also include motion sensing circuitry for detecting motion of an environment of device 100 and/or objects in the environment. For example, the motion sensing circuitry may detect a movement of an object (e.g., an individual) about device 100 and may generate one or more signals based on the detection.

Processor 102 of device 100 may control the operation of many functions and other circuitry provided by device 100. For example, processor 102 may receive input signals from input component 110 and/or drive output signals through output component 112. Processor 102 may load a manager program (e.g., a program stored in memory 104 or another device or server accessible by device 100) to process or analyze data received via detector 114 or inputs received via input component 110 to control output of content that may be provided to the user via output component 112 (e.g., a display).

Electronic device 100 may also be provided with a housing 101 that may at least partially enclose one or more of the components of device 100 for protecting them from debris and other degrading forces external to device 100. Housing 101 may be composed of any suitable type of material (e.g., aluminum). In some embodiments, one or more of the components may be provided within its own housing (e.g., input component 110 may be an independent keyboard or mouse within its own housing that may wirelessly or through a wire communicate with processor 102, which may be provided within its own housing).

Figure 2A:
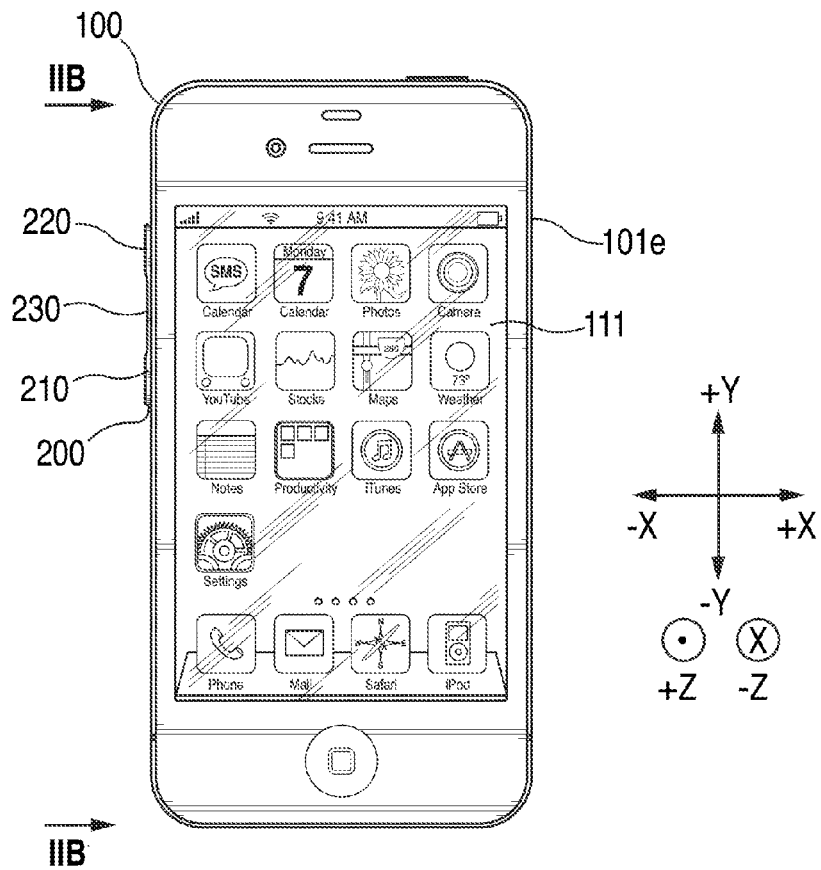
FIG. 2A is a front view of the electronic device of FIG. 1, the electronic device including a button assembly, in accordance with some embodiments of the invention.
Figure 2B:
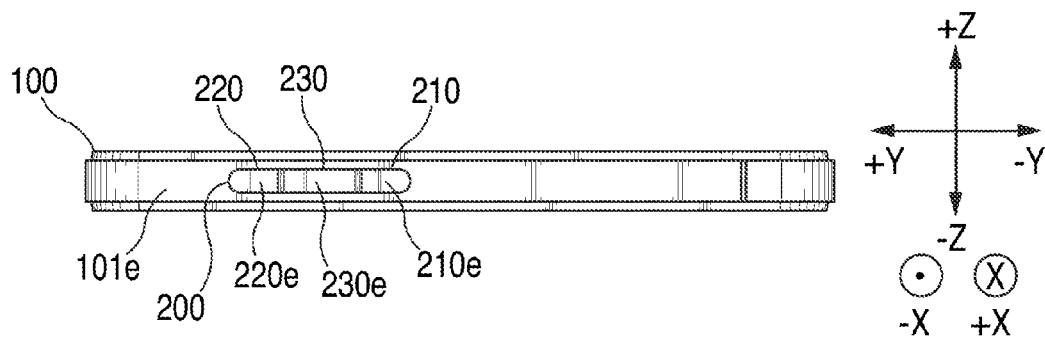
FIG. 2B is a side view of the electronic device of FIGS. 1 and 2A, taken from line IIB-IIB of FIG. 2A, in accordance with some embodiments of the invention.

FIGS. 2A and 2B, for example, show various portions of electronic device 100. As shown in FIG. 2A, for example, electronic device 100 may include housing 101 and I/O interface 111. I/O interface 111 may, for example, include a single touch screen component.

In some embodiments, electronic device 100 may include separate input mechanisms or buttons, each one being dedicated to manipulate the electronic device in a certain way. For example, a first button may be dedicated for powering the electronic device ON or OFF. As another example, a separate second button may be dedicated for increasing a volume setting of the electronic device, and a separate third button may be dedicated for decreasing the volume setting. Employing a number of such buttons may complicate and increase the cost of manufacture of the electronic device. Thus, in other embodiments, it may be advantageous to provide fewer input mechanisms or buttons that may provide users with the same ability to manipulate the electronic device.

In some embodiments, electronic device 100 may include a button assembly 200 that may be disposed on a side portion of housing 101. Button assembly 200 may, for example, be a part of an input component 110 of electronic device 100. Button assembly 200 may include a center region 230 and two end regions 210 and 220. In some embodiments, each one of regions 210, 220, and 230 may exist as separate components that may be coupled to form button assembly 200. In these embodiments, for example, regions 210, 220, and 230 may be connected in a contiguous manner. That is, there may be no physical discontinuities from end region 210 to center region 230, and from center region 230 to end region 220. In other embodiments, button assembly 200 may be constructed as a single structure (e.g., from a single piece of material). In these embodiments, button assembly 200 may not be physically formed from separable regions (e.g., such as regions 210, 220, and 230). Rather, certain portions of button assembly 200 may be distinguished from one another based on, for example, a difference in one or more of their respective physical characteristics. In yet other embodiments, button assembly 200 may include fewer or more regions. For example, rather than including three regions 210, 220, and 230, button assembly 200 may only include two regions (e.g., center region 230 and any one of end region 210 and 220). As another example, rather than including only three regions 210, 220, and 230, button assembly 200 may include one or more extra regions that may each be similar to any one of center region 230 and end regions 210 and 220.

As shown in FIG. 2B, for example, button assembly 200 may be disposed through housing 101 such that each one of a front surface 230f of center region 230, a front surface 210f of end region 210, and a front surface 220f of end region 220 may face away from electronic device 100 (e.g., away from device 100 through an opening in external surface 101e of housing 101) in a −X-direction of FIG. 2A. Although center region 230 and end regions 210 and 220 may form a single button assembly 200, each one of these regions may be configured as a single input mechanism or button that may activate a respective function of electronic device 100. For example, end region 220 may be configured as an input for a volume increase function of electronic device 100 (e.g., a volume setting of electronic device 100 may increase when front surface 220f of end region 220 is depressed in the +X-direction of FIG. 2A). As another example, end region 210 may be configured as an input for a volume decrease function of electronic device 100 (e.g., a volume setting of electronic device 100 may decrease when front surface 210f of end region 210 is depressed in the +X-direction of FIG. 2A). As yet another example, center region 230 may be configured as an input for any other suitable function of electronic device 100 (e.g., a particular setting or function of electronic device 100 may be controlled or affected when front surface 230f of center region 230 is depressed in the +X-direction of FIG. 2A).

FIGS. 3A and 3B, for example, show various portions of button assembly 200. Button assembly 200 may be composed of any suitable material (e.g., 6063 aluminum). As shown in FIG. 3A, and as briefly described above with respect to FIGS. 2A and 2B, for example, button assembly 200 may include center region 230 and end regions 210 and 220. Center region 230 may include a front surface 230f, side surfaces 230s and 230p, and an internal surface 230i. Similarly, end region 210 may include front surface 210f, side surfaces 210s and 210p, and an internal surface 210i, and end region 220 may include front surface 220f, side surfaces 220s and 220p, and an internal surface 220i. When button assembly 200 is integrated with electronic device 100 (e.g., as shown in FIGS. 2A and 2B), for example, side surfaces 230s, 210s, and 220s may each face the +Z-direction of FIG. 2A, side surfaces 230p, 210p, and 220p may each face the −Z-direction of FIG. 2A, and internal surfaces 230i, 210i, and 220i may each face the +X-direction of FIG. 2A.

In some embodiments, button assembly 200 may vary in physical characteristics from region to region. For example, end region 210 may have a predefined thickness 210d (e.g., 0.6 millimeters to 0.7 millimeters) that may extend from front surface 210f to internal surface 210i, and end region 220 may have a predefined thickness 220d (e.g., 0.6 millimeters to 0.7 millimeters) that may similarly extend from front surface 220f to internal surface 220i. In some embodiments, predefined thickness 210d may be equal to predefined thickness 220d. However, a thickness of center region 230 may vary from one end of center region 230 (e.g., at line 210t) to another end of center region 230 (e.g., at line 220t). As shown in FIG. 3B, for example, end region 210 may extend from end 210h to line 210t, and end region 220 may extend from end 220h to line 220t. Further, front surfaces 210f and 220f, and internal surfaces 210i and 220i may each be substantially flat.

In this manner, the thicknesses 210d and 220d may be substantially constant throughout the entireties of end regions 210 and 220, respectively. Front surface 230f and internal surface 230i of center region 230 may also be substantially flat (e.g., from a line 230x to a line 230y). However, center region 230 may include a curved portion 230r1, which may extend from line 210t to line 230x, and a curved portion 230r2, which may extend from line 220t to line 230y. Curved portions 230r1 and 230r2 may vary in thickness from line 210t to 230x and from line 220t to line 230y, respectively. Curved portion 230r1 may have a thickness 210d at line 210t, but may gradually decrease in thickness until line 230x, which may, for example, have thickness 230d (e.g., 0.32 millimeters). Curved portion 230r2 may be substantially similar (e.g., physically) to curved portion 230r1. For example, curved portion 230r2 may have a thickness 220d at line 220t, but may gradually decrease in thickness until line 230y, which may, for example, have thickness 230d. Curved portion 230r1 may extend for a length m1, and may curve at any suitable radius. Similarly, curved portion 230r2 may extend for a length m2 (e.g., that may be equal to m1), and may curve at any suitable radius (e.g., at the same radius as that of curved portion 230r1). The curved configuration of curved portions 230r1 and 230r2 may, for example, allow a user to tactilely distinguish center region 230 and end regions 210 and 220 from one another (e.g., when a user brushes one or more fingers over button assembly 200).

In some embodiments, button assembly 200 may vary in physical flexibility from region to region. This variation may, for example, be due to the difference between the smaller thickness 230d of center region 230 and each one of the larger thicknesses 210d and 220d of end regions 210 and 220, respectively. For example, end regions 210 and 220 may each be composed of a certain material or combination of materials (e.g., aluminum) and may each have the same flexibility (e.g., hardness, stiffness, etc.), whereas center region 230 may also be composed of the same material or combination of materials, but may be more flexible than any one of end regions 210 and 220. That is, a flexibility of at least a portion of center region 230 may be greater than a flexibility of any portion of either one of end regions 210 and 220. This variation in physical flexibility may allow each one of end regions 210 and 220, and center region 230 to essentially function as a separate input mechanism or button. In some embodiments, the flexibility of each one of end regions 210 and 220 and center region 230 may not be constant throughout that region, but may, for example, vary continuously throughout that region (e.g., according to a predefined design requirements). For example, each one of end regions 210 and 220 and center region 230 may have a predefined flexibility profile (e.g., a first flexibility at a first portion of that region, a second flexibility at a second portion of that region, etc.). As described above with respect to FIGS. 2A and 2B, in some embodiments, rather than being formed from separable regions (e.g., such as regions 210, 220, and 230), button assembly 200 may instead be distinguished from one another based on a difference in one or more of their respective physical characteristics. In these embodiments, certain portions (e.g., that may correspond to end regions 210 and 220 and center region 230) of button assembly 200 may be distinguished from one another based on a difference in their respective flexibilities or flexibility profile. Moreover, in some embodiments, each one of regions 210, 220, and 230 may or may not vary in flexibility or be flexible at all, but may instead be coupled to one another via one or more coupling components (not shown) that may be flexible. In these embodiments, the flexibility of such coupling components may, for example, allow a user to distinguish between each one of regions 210, 220, and 230. Additionally, in embodiments where button assembly 200 may be constructed as a single structure or a single button (e.g., as described above), button assembly 200 may include one or more features (e.g., a weakening feature, such as a slit, a perforation, etc.) that may each provide flexibility between certain portions of button assembly 200 on opposite sides of that feature. In these embodiments, for example, the flexibility of such features may allow a user to distinguish between each one of regions 210, 220, and 230.

As shown in FIGS. 3A and 3B, for example, button assembly 200 may be in its natural state. Button assembly 200 may be in its natural state, for example, when no external force (e.g., in the +X-direction) is applied to any portion of any one of front surfaces 210$f$, 220$f$, and 230$f$. In some embodiments, the entirety of center region 230 may be flexible. In these embodiments, when an external force is applied to one or more portions of any one of front surfaces 210$f$, 220$f$, and 230$f$, button assembly 200 may change (e.g., bend) from its natural state. For example, while each one of center region 230 and end regions 210 and 220 is at least partially fixed in place with respect to housing 101 (e.g., via at least one limb that may latch onto or interact with a corresponding portion of housing 101, as described below), center region 230 may bend with respect to either one of end regions 210 and 220, when an external force is applied to an appropriate portion of one of front surfaces 210$f$, 220$f$, and 230$f$. In other embodiments, only curved portions 230$r$1 and 230$r$2 may be more flexible than any one of end regions 210 and 220. In these embodiments, the portion of center region 230 that may extend from line 230$x$ to 230$y$ may have the same hardness or stiffness as each one of end regions 210 and 220. In this configuration, each one of curved portions 230$r$1 and 230$r$2 may act as a pivot that may allow center region 230 to bend with respect to corresponding end regions 210 and 220. That is, while each one of center region 230 and end regions 210 and 220 is at least partially fixed in place with respect to housing 101 (e.g., via at least one limb that may latch onto or interact with a corresponding portion of housing 101, as described below), center region 230 may bend with respect to corresponding end regions 210 and 220, when an external force is applied to an appropriate portion of one of front surfaces 210$f$, 220$f$, and 230$f$.

Center region 230 may have a length n3, and end regions 210 and 220 may have lengths n1 and n2, respectively. In some embodiments, length n3 may be equal to a sum of length n1, length n2, and a length m3 of FIG. 3A. Length $n_1$ may be equal to length n2. Button assembly 200 may have a total length of q, which may be the sum of lengths n1, n2, and n3. In some embodiments, button assembly 200 may be rotationally symmetric. For example, length n1 may be equal to length n2, and a length of a portion of center region 230 (e.g., that may extend from line 210$t$ to a midpoint 230$m$ of center region 230) may be equal to a length of another portion of center region 230 (e.g., that may extend from line 220$t$ to midpoint 230$m$).

In some embodiments, button assembly 200 may also include a set of limbs that may each be configured to secure to a corresponding portion of electronic device 100. As shown in FIG. 3B, for example, button assembly 200 may include a limb 212 that may extend from internal surface 210$i$ at end 210$h$ of end region 210, and a limb 222 that may extend from internal surface 220$i$ at end 220$h$ of end region 220. Button assembly may also include limbs 232 and 234 that may each extend from internal surface 230$i$ of center region 230. Each of limbs 212, 222, 232, and 234 may include a corresponding leg and a foot. For example, limb 212 may include a leg 212$j$ that may protrude from internal surface 210$i$, and that may lead to a foot 212$f$, and limb 222 may include a leg 222$j$ that may protrude from internal surface 220$i$, and that may lead to a foot 222$f$. Each of legs 212$j$ and 222$j$ may, for example, protrude from internal surfaces 210$i$ and 220$i$, respectively, in the +X-direction. Moreover, as shown in FIGS. 3A and 3B, foot 212$f$ may point in the −Y-direction and foot 222$f$ may point in the +Y-direction. Similarly, each of legs 232$j$ and 234$j$ may, for example, protrude from internal surface 230$i$ in the +X-direction. Moreover, each one of feet 232$f$ and 234$f$ may, instead, be pointing in the −Z-direction (e.g., into the page).

FIG. 4A, for example, shows button assembly 200 being disposed adjacent to a set of switches 310, 320, and 330. Switches 310, 320, and 330 may each be disposed at a predefined location within electronic device 100 (e.g., within housing 101 underneath button assembly 200). Moreover, switches 310, 320, and 330 may, in some embodiments, be secured in their respective predefined locations via one or more support brackets (e.g., as described with respect to FIG. 14). Switches 310, 320, and 330 may, for example, be similar to one another, and may include any suitable type of switch (e.g., a pushbutton switch). For example, each one of switches 310, 320, and 330 may include a corresponding frame 312, 322, and 332, respectively, and a corresponding activator 314, 324, and 334, respectively. Each one of activators 314, 324, and 334 may be configured to depress (e.g., into the corresponding frame), when a force is applied thereon (e.g., by button assembly 200). Moreover, each one of activators 314, 324, and 334 may be configured to undepress (e.g., protrude from the corresponding frame, as shown, for example, in FIG. 4A), when no force is applied thereon. Hence, each one of switches 310, 320, and 330 may be capable of occupying a depressed state (e.g., when its corresponding activator is depressed), and a natural state (e.g., when its corresponding activator is not being depressed). As shown in FIG. 4A, for example, each one of switches 310, 320, and 330 may be in its natural state (e.g., when no external force is applied to a corresponding one of activator surfaces 314$f$, 324$f$, and 334$f$ of switches 310, 320, and 330). In some embodiments, when no external force is applied to any portion of any one of front surfaces 210$f$, 220$f$, and 230$f$ of button assembly 200, each one of button assembly 200 and switches 310, 320, and 330 may be in their respective natural states. In these natural states, each one of portions 213, 223, and 233 of button assembly 200 may be flush or in contact with a corresponding one of activator surfaces 314$f$, 324$f$, and 334$f$. In other embodiments, when no external force is applied to any portion of any one of front surfaces 210$f$, 220$f$, and 230$f$, a respective gap (not shown) may exist between each one of portions 213, 223, and 233 and a corresponding one of activator surfaces 314$f$, 324$f$, and 334$f$. Switches 310, 320, and 330 may also include corresponding circuitry (not shown) that may be disposed within their respective frames 312, 322, and 332. Each circuitry may, for example, be configured to output an electrical signal each time a corresponding one of activators 314, 324, or 334 is depressed. As shown in FIG. 4A, for example, each one of switches 310, 320, and 330 (e.g., each one of activators 314, 324, and 334) may be in its respective natural state. For example, a portion 213 of end region 210 along surface 210$i$ may be disposed adjacent to activator surface 314$f$ of activator 314 (e.g., when activator 314 is in its natural state) along surface 220$i$, a portion 223 of end region 220 may be disposed adjacent to activator surface 324$f$ of activator 324 (e.g., when activator 324 is in its natural state) along surface 230$i$, and a portion 233 of center region 230 may be disposed adjacent to activator surface 334$f$ of activator 334 (e.g., when activator 334 is in its respective natural state). When an external force is applied to any one of activator surfaces 314f, 324f, and 334f, a corresponding one of activators 312, 324, or 334 may transition from its natural state to a depressed stated (e.g., depressed in the +X-direction into a cavity (not shown) of a corresponding one of frames 312, 322, and 332). For example, when an external force is applied (e.g., by a finger of a user of device 100) in the +X-direction onto a portion of any one of front surfaces 210f, 220f, and 230f, a corresponding one of portions 213, 223, and 233 may exert a similar force onto a corresponding one of activator surfaces 314f, 324f, and 334f. This may, as a result, cause that activator to depress in the +X-direction.

FIGS. 4B-4D, for example, show button assembly 200 and switches 310, 320, and 330 occupying various states. In particular, FIGS. 4B-4D may show simplified representations of button assembly 200 of FIG. 4A. As shown in FIG. 4B, for example, button assembly 200 may be in its natural state. In its natural state, button assembly 200 may be substantially parallel with a horizontal line P1 (e.g., a line that may run along the top surfaces of switches 310, 320, and 330 in their natural states). Moreover, each one of switches 310, 320, and 330 may be in its natural state (e.g., similar to the natural state of switches 310, 320, and 330 described above with respect to FIG. 4A).

As described above with respect to FIGS. 3A and 3B, because curved portions 230r1 and 230r2 of button assembly 200 may be more flexible than end regions 310 and 320, button assembly 200 may change from its natural state (e.g., center region 230 may bend with respect to each one of end regions 310 and 320), when a force is applied to one or more appropriate portions of button assembly 200 (e.g., front surface 230f of center region 230). As shown in FIG. 4C, for example, button assembly 200 may be subjected to a force F330 (e.g., a force that may be applied by a user in order to depress switch 330) at portion 233 of center region 230 (e.g., at a portion of center region 230 along surface 230f). As a result, center region 230 may bend with respect to each one of end regions 210 and 220 in the +X-direction. Because regions 210, 220, and 230 may contiguously form button assembly 200, the bending of center region 230 in the +X-direction may force each one of end regions 210 and 220 to move in the −X-direction. More particularly, the bending of center region 230 in the +X-direction may result in a force Fr1 being applied to end region 210 in the −X-direction and a force Fr2 being applied to end region 220 in the −X-direction. As shown in FIG. 4C, for example, forces Fr1 and Fr2 may cause respective end regions 210 and 220 to move with respect to horizontal line P1, and away from a corresponding one of activator surfaces 314f and 324f. In particular, end region 210 may move or bend with respect to horizontal line P1 at an angle α1, and end region 220 may move or bend with respect to horizontal line P2 at an angle α2 (e.g., which may be similar or equal to angle α1). In contrast, force F330 may cause center region 230 to contact activator surface 334f of activator 334 and depress activator 334 in the +X-direction into frame 332. As a result, switch 330 may be activated, and switches 310 and 320 may remain in their respective natural states (e.g., un-depressed states). In this manner, a particular region (e.g., center region 230) of button assembly 200 may function as an individual input mechanism or button for electronic device 100.

As shown in FIG. 4D, for example, button assembly 200 may be subjected to a force F310 (e.g., that may be applied by a user in order to depress switch 310) at portion 213 of end region 210 (e.g., along surface 210f of end region 210). In the presence of force F310, end region 210 may move in the +X-direction such that portion 213 may contact activator surface 314f and depress activator 314 in the +X-direction. The movement of end region 210 may form an angle α3 with respect to horizontal line P1. Moreover, center region 230 may bend with respect to end region 210 in the +X-direction (e.g., due to the flexible configuration of curved portion 230r1). Because regions 210, 220, and 230 may contiguously form button assembly 200, the bending of center region 230 (e.g., in the +X-direction with respect to end region 210 may force the contiguous regions of center region 230 and end region 220 to move towards the +X-direction. In particular, the combined weights of center region 230 and end region 220 may result in a reactionary force Fr4 that may force center region 230 and end region 220 to move in the +X-direction. This movement may, for example, make button assembly 200 appear to be in a bowed state.

In addition, a reactionary force Fr3 may be applied by activator surface 334f (e.g., via activator 334) onto portion 233 of center region 230. In particular, the movement of center region 230 in the +X-direction may be sufficient make contact between portion 233 and activator surface 334f. However, button assembly 200 may be configured such that this contact may not be sufficient to depress activator 334 in the +X-direction. Thus, in some embodiments, activator 334 may act as a pivot that may prevent portion 423 from contacting activator surface 324f. In other embodiments, activator 334 may act as a pivot that may allow portion 423 to contact activator surface 324f, but may prevent portion 423 from actually depressing activator 324 in the +X-direction. As a result, switch 310 may be depressed, and switches 320 and 330 may remain in their respective natural states (e.g., un-depressed). In this manner, another region (e.g., end region 210) of button assembly 200 may also function as another individual input mechanism or button for electronic device 100.

It should be appreciated that, although FIG. 4D may only show end region 310 having a force F310 applied thereon, end region 320 rather than end region 310 may, instead, have a similar force applied thereon. In this scenario, button assembly 200 may bend similarly as shown in FIG. 4D, but end region 220 may move toward the +X-direction (e.g., due to the flexible configuration of curved portion 230r2) and portion 423 may contact activator surface 324f and depress activator 324 in the +X-direction. Moreover, center region 230 and end region 210 may reside above corresponding switches 330 and 310, respectively.

Although FIGS. 4C and 4D may show forces F330 and F310 being applied to specific portions of button assembly 200, each one of forces F330 and F310 may, instead, be applied to any other suitable portion of center region 230 and end region 210, respectively, as long as a desired switch (e.g., switch 330, as shown in FIG. 4C, and switch 310, as shown in FIG. 4D) may be activated, and the remaining switches may remain in their respective natural states (e.g., switches 310 and 320, as shown in FIG. 4C, and switches 320 and 330, as shown in FIG. 4D).

As shown in FIGS. 5 and 6, for example, button assembly 200 may be coupled to electronic device 100 (e.g., similar to what is shown in FIGS. 2A and 2B) via a portion of housing 101. Housing 101 may include a structural post 152 that may enhance the structural integrity of housing 101 (e.g., at least in the Z-direction). Housing 101 may include external surface 101e and an internal surface 101i. External surface 101e may include an external opening 176. Internal surface 101i may include internal openings 172 and 174. Internal opening 172 may be larger than internal opening 174, and may, for example, be separated from internal opening 174 by structural post 152. Hence, external opening 176 may be larger than a combination of internal openings 172 and 174. Moreover, external opening 176 may be fluid with openings 172 and 174. Button assembly 200 may be disposed within external opening 176. As shown in FIG. 6, for example, button assembly 200 may be disposed over external opening 176 such that the portion of center region 230, that may extend from line 230x to 230y, may be parallel to external surface side 101e of housing 101. In some embodiments, external surface side 101e may not be entirely flat or planar as depicted in FIGS. 2A and 2B, but may instead include a portion that may be at least partially indented in the +X-direction (e.g., with respect to the rest of external surface side 101e) in the vicinity leading to external opening 176. In these embodiments, button assembly 200 may protrude from this indented portion of external surface side 101e in the −X-direction. In this manner, at least a portion of each one of side surfaces 210s, 210p, 220s, 220p, 230s, and 230p of button assembly 200 may be exposed outside of housing 101. This configuration may, for example, provide a user with improved tactility of the various regions of button assembly 200 with respect to housing 101.

As shown in FIG. 5, for example, button assembly 200 may be oriented such that an inner surface 200i (e.g., a combination of internal surfaces 210i, 220i, and 230i) of button assembly 200 may face the inside of housing 101. Although button assembly 200 may have been described above as having separate and substantially flat surfaces 210i, 220i, and 230i, in some embodiments, the inner surface 200i of button assembly 200 may be a contiguous flat surface. Moreover, inner surface 200i may not span the entire length q of button assembly 200, but may be surrounded by a wall 200w. As shown in FIG. 5, for example, button assembly 200 may include wall 200w and a recess 200r. Wall 200w and inner surface 200i may, for example, each extend in the X-direction of FIG. 6 to form the various thicknesses of center region 230 and end regions 210 and 220. Recess 200r may extend from inner surface 200i to a wall surface 200w1. When button assembly 200 is coupled to housing 101, for example, recess 200r may reside entirely within housing 101. Surface 200i may be substantially flat throughout the entirety of recess 200r (e.g., from end region 210 to center region 230, and from center region 230 to end region 220). In some embodiments, button assembly 200 may not include recess 200r, but may instead include an entirely flat surface throughout surface 200i of button assembly 200. In these embodiments, button assembly 200 may, for example, be composed of a more flexible material (e.g., plastic) or be positioned farther within housing 101 in the +X-direction.

As shown in FIG. 5, for example, button assembly 200 may be secured within housing 101 via the set of limbs 212, 222, 232, and 234. In particular, foot 212f of limb 212 may contact or interface with a wall portion 101w1 of housing 101. For example, in some embodiments, foot 212f may releasably couple to wall portion 101w1 by hooking or latching, via front surface 212f1, onto wall portion 101w1, when end region 210 is aligned with external surface 101e of housing 101. Alternatively, foot 212f may contact (e.g., passively) surface 101i of wall portion 101w1. Similarly, foot 222f of limb 222 may contact or interface with a wall portion 101w4 of housing 101 via front surface 222f1 of foot 222f. For example, foot 222f may releasably couple to wall portion 101w4 by hooking or latching onto wall portion 101w4, when end region 220 is aligned with external surface 101e of housing 101. Each of limbs 232 and 234 may secure to housing 101 via feet 232f and 234f, respectively. In particular, leg 232j of limb 232 may extend along a portion of a side surface 101p (e.g., about external opening 176) such that foot 232f may hook or latch onto a wall portion 101w2 of a recess portion 101r1 of housing 101. Leg 234j of limb 234 may similarly extend along another portion of surface 101p of housing 101 (e.g., about external opening 176) such that foot 234f may hook or latch onto a wall portion 101w3 of a recess 101r2 of housing 101. In this manner, wall portions 101w1-101w4 may prevent button assembly 200 from moving in a direction away from housing 101 (e.g., the −X-direction out of housing 101 through external opening 176).

Although wall portions 101w1-101w4 may prevent button assembly 200 from moving in a direction away from housing 101 (e.g., the −X-direction), in some embodiments, wall portions 101w1-101w4 may not be configured to prevent button assembly 200 from moving farther into electronic device 100 (e.g., in the +X-direction due to any of forces F310 and F330). For example, housing 101 may not include any structural barriers opposite to any one of wall portions 101w1-101w4. That is, housing 101 may not include any structural barriers that may prevent any one of feet surfaces 212f, 222f, 232f, and 234f from moving in the +X-direction within housing 101. Instead, housing 101 may include space 101s that may be positioned directly below each one of wall portions 101w1-101w4, such that each one of limbs 212, 222, 232, and 234 may be free to move away from a corresponding one of wall portions 101w1-101w4 and farther into electronic device 100 (e.g., in the +X-direction). Moreover, in some embodiments, structural post 152 of housing 101, which may be disposed within housing 101 underneath external opening 176, also may not be configured to prevent button assembly 200 from moving at least some distance farther into electronic device 100. For example, structural post 152 may be positioned a predefined distance k from external surface 101e, such that no portion (e.g., not even surface 200i) of button assembly 200 may be in contact with an external surface 152e of structural post 152. Thus, when switches 310, 320, and 330 are fixed in place within housing 101 (e.g., as shown in FIGS. 5 and 6), switches 310, 320, and 330 may be the only barriers that may prevent button assembly 200 from moving farther into electronic device 100 in the +X-direction.

As described above with respect to FIG. 4C, for example, when external force F330 is applied to portion 233 of button assembly 200, reactionary forces Fr1 and Fr2 may be produced. Due to these reactionary forces, each one of feet 212f and 222f of button assembly 200 may, for example, attempt to move in the −X-direction. However, because foot 212f may already be hooking, latching, contacting, or otherwise interacting with wall portion 101w1, and because foot 222f may already be hooking, latching, contacting, or otherwise interacting with wall portion 101w4, reactionary forces Fr1 and Fr2 may not actually move feet 212f and 222f in the −X-direction, but may instead strengthen the interaction thereof with the corresponding wall portion of housing 101.

As shown in FIGS. 5 and 6, for example, switches 310, 320, and 330 may be disposed such that surfaces 312i, 322i, and 332i, respectively, may face the inside of housing 101 (e.g., in the +X-direction), and surfaces 312f, 322f, and 322f, respectively, may face away from housing 101 (e.g., in the −X-direction). Each one of surfaces 312f, 322f, and 332f may, for example, be substantially parallel to surface 200i, and may prevent corresponding portion (e.g., center region 230, end region 210, and end region 220) of button assembly 200 from entering farther into housing 101 and beyond switches 310, 320, and 330. In addition, although structural post 152 may be positioned the predefined distance k underneath external surface 101e of housing 101, structural post 152 may also prevent button assembly 200 from entering into housing 101 and beyond structural post 152 (e.g., in the event that any one of switches 310, 320, and 330 is no longer fixed in place within housing 101).

As shown in FIGS. 5 and 6, for example, each one of limbs 212, 222, 232, and 234 of button assembly 200 may protrude in the +X-direction, towards the inside of electronic device 100 such that each one of the respective feet 212$f$, 222$f$, 232$f$, and 234$f$ may hook, latch, or otherwise interact with a corresponding portion of housing 101. To properly align each one of limbs 212, 222, 232, and 234 (and thus, feet 212$f$, 222$f$, 232$f$, and 234$f$) to the corresponding portions of electronic device 100, button assembly 200 may be integrated with housing 101 by first positioning button assembly 200 within housing 101 (e.g., inside of electronic device 100). For example, while the portion of housing 101 shown in FIGS. 5 and 6 is made accessible, button assembly 200 may first be positioned within housing 101. Button assembly 200 may, for example, be positioned within housing 101 with each one of surfaces 210$f$, 220$f$, and 230$f$ facing the −X-direction. End region 220 may then be moved in the −X-direction and the +Y-direction (e.g., in the direction of arrow I) around external surface 152$e$ of structural post 152 until end 220$h$ is aligned with an end of external opening 176 and foot 222$f$ is aligned with wall portion 101$w$4. It should be appreciated that the flexibility of center region 230 may allow the movement of end region 220 around structural post 152 described above. Subsequently, the remainder of button assembly 200 may be aligned with corresponding portions of external opening 176, and the remaining feet of button assembly 200 may be aligned with the corresponding portions of housing 101 (e.g., as described above).

Although button assembly 200 may be shown (e.g., in FIGS. 2A and 3A) and described above as being substantially free of markings, in some embodiments, portions of button assembly 200 may include one or more indicators or markings. For example, as shown in FIG. 7, front surface 210$f$ of end region 210 may include a marking 282, and front surface 220$f$ of end region 220 may include a marking 284. As described above with respect to FIGS. 2A and 2B, end region 220 may, for example, be configured as an input for a volume increase function of electronic device 100 (e.g., a volume setting of electronic device 100 may increase when front surface 220$f$ of end region 220 is depressed in the +X-direction of FIG. 2A), and thus marking 284 may be a "+" symbol. Moreover, end region 210 may be configured as an input for a volume decrease function of electronic device 100 (e.g., a volume setting of electronic device 100 may decrease when front surface 210$f$ of end region 210 is depressed in the +X-direction of FIG. 2A), and thus marking 282 may be a "−" symbol. In some embodiments, each one of front surfaces 210$f$ and 220$f$ may be computer numeric control ("CNC") cut to form markings 282 and 284, respectively. In other embodiments, markings 282 and 284 may each be etched (e.g., via laser etching or any other suitable form of etching) onto front surfaces 210$f$ and 220$f$, respectively. In yet other embodiments, each one of front surfaces 210$f$ and 220$f$ may be polished or surface finished to form markings 282 and 284. It should be appreciated, that although front surface 230$f$ of center region 230 may not be shown to include any markings, front surface 230$f$ may also include a marking that may be similar to any one of markings 282 and 284. Moreover, in some embodiments, center region 230 (e.g., front surface 230$f$) may visually distinguish from each one of end regions 210 and 220 (e.g., front surfaces 210$f$ and 220$f$, respectively). For example, front surfaces 210$f$ and 220$f$ may each be surface finished in one manner (e.g., bead blasted), and front surface 230$f$ may be surface finished in different manner (e.g., polished). The difference in visual characteristics between front surface 230$f$ and front surfaces 210$f$ and 220$f$ may, for example, allow a user to easily discern the locations of each of regions 210, 220, and 230.

Figure 9:
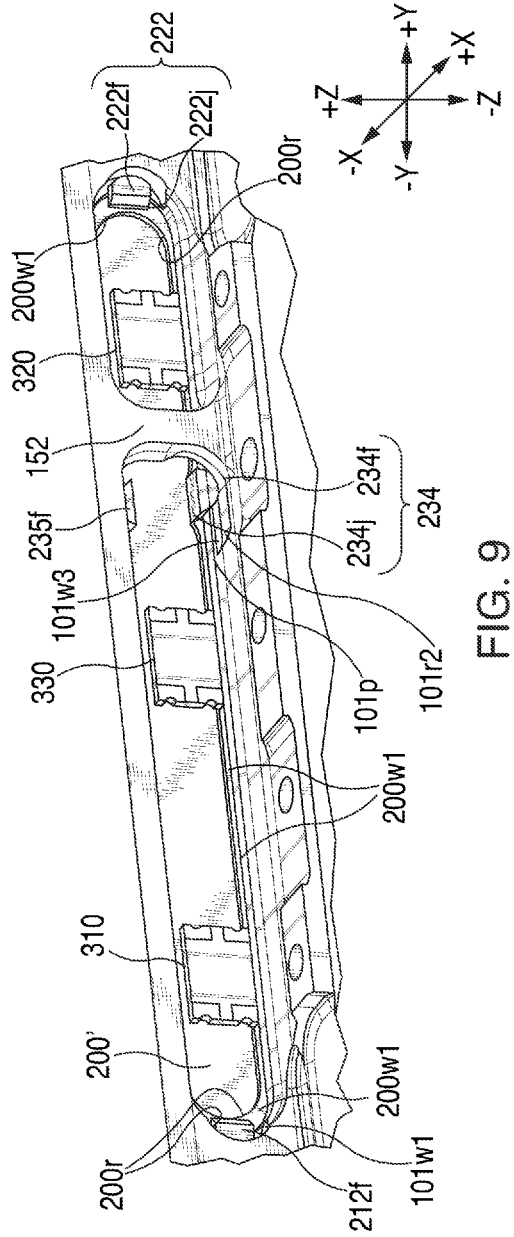
FIG. 9 is a perspective view, similar to FIG. 5, of the portion of the electronic device of FIG. 5, the portion including the first alternative button assembly of FIG. 8 and the set of switches of FIGS. 4A-6, in accordance with some embodiments of the invention.

Although button assembly 200 has been shown (e.g., in FIGS. 2A and 3A) and described above as having limbs (e.g., limbs 232 and 234) positioned in specific locations (e.g., both of limbs 232 and 234 being positioned adjacent a single side surface 230$s$ of button assembly 200), in some embodiments, a button assembly may, instead, include one limb adjacent side surface 230$s$ and another limb adjacent side surface 230$p$. As shown in FIGS. 8 and 9, for example, button assembly 200' may be the same as button assembly 200, but may include an alternative limb configuration. In particular, button assembly 200' may include center region 230, end regions 210 and 220, and all the features thereof that have been described above with respect to FIGS. 2A-7. Button assembly 200' may also include limbs 212 and 222. Moreover, button assembly 200' may also include limb 234 adjacent side surface 230$s$. However, rather than including limb 232 adjacent side surface 230$s$ (e.g., as with button assembly 200), button assembly 200' may include a limb 235 on side surface 230$p$. For example, limb 235 may be positioned adjacent to limb 234, in the +Z-direction of FIG. 8. Limb 235 may include a leg 235$j$ that may be similar to leg 234$j$, and that may protrude from button assembly 200 in the +X-direction of FIG. 8. Limb 235 may also include a foot 235$f$ that may point in the +Z-direction of FIG. 8. As shown in FIG. 9, foot 235$f$ may releasably couple to a recess of housing 101 that may be similar to recess 101$r_2$. The coupling of foot 235$f$ to this recess may, for example, be similar to the coupling of foot 234$f$ to recess 101$r$2 (e.g., as described above with respect to FIGS. 5 and 6).

Figure 10:
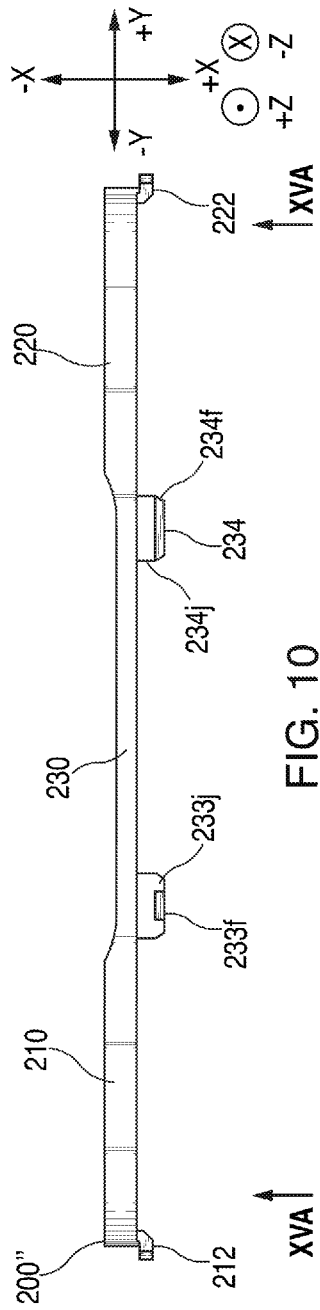
FIG. 10 is a side view, similar to FIG. 8, of a second alternative button assembly, similar to the button assembly of FIGS. 2A-4A and 5-7 and the first alternative button assembly of FIGS. 8 and 9, in accordance with some embodiments of the invention.

As shown in FIG. 9, for example, limb 235 may be positioned directly across from limb 234. It should be appreciated that, although limb 235 may be shown as being positioned directly across from limb 234, limb 235 may, instead, be shifted in any of the ±Y-directions of FIG. 8, by any suitable amount. As shown in FIGS. 10 and 11, for example, a button assembly 200" may be the same as button assembly 200, but may include another alternative limb configuration (e.g., that may be different than the alternative limb configuration of button assembly 200'). As with button assembly 200', button assembly 200" may also include center region 230, end regions 210 and 220, and all the features thereof that have been described above with respect to FIGS. 2A-7. Button assembly 200" may also include limbs 212 and 222. Moreover, button assembly 200" may also include limb 234 adjacent side surface 230$s$. However, rather than including limb 232 adjacent side surface 230$s$ (e.g., as with button assembly 200) or limb 235 adjacent side surface 230$p$ positioned directly across from limb 234 (e.g., as with button assembly 200'), button assembly 200" may include a limb 233 adjacent side surface 230$p$ that may be shifted in the −Y-direction of FIG. 10 from limb 234, by a predetermined amount. Limb 233 may include a leg 233$j$ that may be similar to leg 234$j$, and that may protrude from button assembly 200 in the +X-direction. Limb 235 may also include a foot 233$f$ that may point in the +Z-direction. Foot 233$f$ may releasably couple or otherwise interact with a recess of housing 101 that may be similar to recess 101$r$2. The interaction of foot 233$f$ with this recess may, for example, be similar to the interaction of foot 234$f$ with recess 101$r$2 (e.g., as described above with respect to FIGS. 5 and 6).

As shown in FIG. 12, for example, leg 233$j$ of button assembly 200" may rest on or run adjacent to a portion of surface 101$q$ of housing 101, and foot 233$f$ may releasably couple or otherwise interact with a recess 101$r_5$ of housing 101. In particular, a front surface 233f1 of foot 233f may hook, latch, contact, or otherwise interact with a wall portion 101w5 of recess 101r5, which may prevent movement of button assembly 200" in the −X-direction. Similarly, leg 234j of limb 234 may rest on or run adjacent to a portion of surface 101p of housing 101, and foot 234f may releasably couple or otherwise interact with recess 101r2. In particular, a front surface 234f1 of foot 234f may hook or latch onto wall portion 101w3 of recess 101r2, which may further prevent movement of button assembly 200" in the −X-direction.

As shown in FIG. 12, for example, switch 330 may be coupled to a circuit board 530". Circuit board 530" may be a central or primary printed circuit board ("PCB") of electronic device 100, and may also be known as a main circuit board, motherboard, mainboard, baseboard, system board, planar board, or logic board. In some embodiments, circuit board 530" may be a flexible circuit board or a set of flexible traces that may, for example, be coupled to another circuit board (not shown) of electronic device 100. In these embodiments, one or more portions of circuit board 530" may bendable in one or more directions. Circuit board 530" may provide one or more attachment points to switch 330. Generally, most of the basic circuitry and components required for electronic device 100 to function may be onboard or coupled (e.g., via one or more cables, bond pads, leads, terminals, cables, wires, contact regions, etc.) to circuit board 530". For example, surface 332i of switch 330 may be mounted or otherwise coupled to a front surface 530"f of circuit board 530". Circuit board 530" may include one or more chipsets or specialized groups of integrated circuits. For example, circuit board 530" may include two components or chips, such as a Northbridge and Southbridge. Although in other embodiments, these chips may be combined into a single component. Besides switch 330, various other electronic components (e.g., a processor, memory, power supply, communications circuitry, input component, output component, and combinations thereof) may also be mounted or otherwise coupled to suitable portions of circuit board 530".

Although FIG. 12 may only show a portion of circuit board 530", it should be appreciated that circuit board 530" may extend in any one of the ±Y-directions, similar to how button assembly 200" may extend in the ±Y-directions (e.g., as shown in FIGS. 10 and 11). In some embodiments, circuit board 530" may extend at least from a line V1 to a line V4 of FIG. 11. For example, circuit board 530" may be coupled to each of switches 310, 320, and 330, where a portion of circuit board 530" may be positioned between external surface 152e of structural post 152 and a portion of button assembly 200". In such embodiments, circuit board 530" may be thin enough (e.g., equal to or less than distance k) such that it may fit between external surface 152e of structural post 152 and the adjacent portion of button assembly 200". In other embodiments, separate circuit boards 530" may be employed. For example, a first circuit board 530" may be coupled to switches 310 and 320, and a second circuit board 530", that may be at least partially separate from the first circuit board 530", may be coupled to switch 320. In such embodiments, the first circuit board 530" may extend at least from line V1 to a line V2 of FIG. 11, and the second circuit board 530" may extend at least from a line V3 to a line V4 of FIG. 11.

Although legs 212j, 222j, 232j, 233j, 234j, and 235j of limbs 212, 222, 232, 233, 234, and 235, respectively, have been described above as each resting against or being adjacent to a corresponding portion of housing 101 (e.g., surface 101p or 101q), in some embodiments, one or more gaps may exist between any of legs 212j, 222j, 232j, 233j, 234j, and 235j and the corresponding portion of housing 101. As shown in FIG. 12, for example, a gap g1 may exist between limb 233j and surface 101q. With such a gap g1, in addition to limb 233 being able to move in the +X-direction with respect to wall portion 101w5, limb 233 may also be able to move in the +Z-direction (e.g., towards surface 101q). As shown in FIG. 13, for example, a gap g2 may exist between limb 234 and surface 101p. Moreover, a gap g3 may exist between wall 200w and surface 101q. Each one of these gaps may, for example, prevent the legs of button assembly 200" from brushing against corresponding surfaces 101p and 101q of housing 101. For example, over time, such brushing may wear out or damage button assembly 200" and/or housing 101.

In some embodiments, it may additionally or alternatively be desirable to limit movement of button assembly 200" (e.g., in the +Z-direction), while retaining each of these gaps. In these embodiments, button assembly 200" may not be configured to directly contact switches 310, 320, and 330. Instead, button assembly 200" may be configured to contact switches 310, 320, and 330 via one or more shims. As shown in FIG. 13, for example, portion 233 of center region 230 along surface 230i may be coupled to a shim 650. Shim 650 may be composed of any suitable material or combination of materials. In some embodiments, for example, shim 650 may be composed of a layer of stainless steel that may be sandwiched between two layers of pressure-sensitive adhesive ("PSA"). Each one of these layers of PSA may, for example, be composed of a polyethylene terephthalate (e.g., "PET" or polyester) carrier component that may be sandwiched between two adhesive components. In other embodiments, shim 650 may, for example, be composed of any one of the combinations of PSA and stainless steel, PSA and PET, and PSA, PET, and PSA.

As described above with respect to FIGS. 3A and 3B, a button assembly may vary in physical flexibility from region to region due to differences in the thickness of each one of the regions. For example, button assembly 200" may vary in physical flexibility from end region 210 to center region 230, and from center region 230 to end region 220. A user may, for example, detect the difference in flexibility between the regions when depressing each one of these regions. In some embodiments, shim 650 may be constructed of PSA and stainless steel, and may be included between button assembly 200" and the corresponding switches 310, 320, and 330 (e.g., a respective one of shim 650 may be positioned between center region 230 and switch 330, end region 210 and switch 310, and end region 220 and switch 320). In these embodiments, although the stainless steel of shim 650 may affect a user-detected flexibility of each one of center region 230 and end regions 210 and 220, the PSA of shim 650 may be compliant enough not to affect these flexibilities. In other embodiments, shim 650 may be constructed of plastic and stainless steel. In these embodiments, each one of the plastic and the stainless steel may affect the user-detected flexibility of each one of center region 230 and end regions 210 and 220.

Shim 650 may be larger than each of portion 233 and activator switch 334 in any one of the ±Y and ±Z-directions. Moreover, shim 650 may be small enough to couple to only a portion of center region 230. A first side of shim 650 may couple to center region 230 via an adhesive 654. Adhesive 654 may be composed of any suitable material (e.g., pressure-sensitive adhesive ("PSA")). A second side of shim 650 may couple to activator surface 334f via an adhesive 652 (e.g., that may be similar to adhesive 654). As described above with respect to FIG. 4A (and further described below with respect to FIG. 14), each one of switches 310, 320, and 330 may be secured within housing 101 via one or more support brackets.

Thus, by adhering center region 230 to switch 330 via a shim (e.g., as shown in FIG. 13), button assembly 200" may also at least partially be secured within housing 101. In this manner, gaps (e.g., gaps g1-g3) may be present between button assembly 200" and housing 101, but button assembly 200" may be at least partially restricted from movement in at least the ±Z-directions.

Although FIG. 13 may show shim 650 being disposed between center region 230 and switch 330, it should be appreciated, that a shim (e.g., that may be similar to shim 650), and adhesives (e.g., that may be similar to adhesives 652 and 654) may also be disposed between any of end region 210 and switch 310 and/or between end region 220 and switch 320.

As described above with respect to FIG. 4A, for example, each one of switches 310, 320, and 330 may be secured in their respective predefined locations within housing 101. In some embodiments, switches 310, 320, and 330 may be secured in position by one or more support brackets. As shown in FIG. 14, for example, a bracket 752 may be included to secure switch 320 in its respective predefined location within housing 101. Bracket 752 may be composed of any suitable material (e.g., plastic, metal, etc.). Although FIG. 14 may only show a portion of bracket 752, it should be appreciated that bracket 752 may extend (e.g., while retaining its shape) in the ±Y-directions, similar to how button assembly 200" may extend in the ±Y-directions (e.g., as shown in FIGS. 10 and 11), and similar to how circuit board 530 may extend in ±Y-directions (e.g., as described above with respect to FIG. 12). Moreover, bracket 752 may also extend in the +X-direction. Bracket 752 may include an arm portion 760 and a hand portion 762. Arm portion 760 may lead into hand portion via a curve 752c. Surface 752m of arm portion 760 may rest upon and/or couple to (e.g., via an adhesive, a screw, etc.) a corresponding portion of housing 101. In this manner, bracket 752 may be at least partially fixed within housing 101. Hand portion 762 may include walls 754 and 756, and a recess 752r that may reside between walls 754 and 756. Recess 752r may be configured to support at least a portion of circuit board 530 via a recess surface 752p. As shown in FIG. 14, for example, an internal surface 530i of circuit board 530 may be coupled to recess surface 752p via an adhesive 656. Adhesive 656 may be similar to any one of adhesives 652 and 654. Front surface 530f of circuit board 530 may also be coupled to switch 320. In this manner, switch 320 may be secured in its respective location within housing 101 via bracket 752.

In some embodiments, bracket 752 may be configured to extend from at least line V1 to line V2 of FIG. 11 without interruption. However, due to the position of structural post 152, the shape of bracket 752 may not be retained throughout its entire extension. As shown in FIG. 14, for example, bracket 752 may include arm portion 760 and hand portion 762. Bracket 752 may retain the shape of hand portion 762 at least from line V1 to line V2 (e.g., in order to support each one of switches 310 and 330). However, at any point between line V2 and edge 152x of structural post 152, the shape of hand portion 762 (or of bracket 752, in general) may begin to change in order to accommodate structural post 152. For example, each one of walls 752 and 754, and surface 752p of hand portion 762 may begin to recede farther in the +X-direction towards arm portion 760. As another example, the entirety of hand portion 762 may be removed (e.g., gradually), leaving only arm portion 760. As yet another example, the entirety of hand portion 762 may be removed (e.g., gradually), and at least a portion of arm portion 760 may also be removed (e.g., gradually). This change in shape of hand portion 762 (or of bracket 752, in general) may continue in the +Y-direction, for example, until some point between edge 152y of structural post 152 and line V2. At this point, for example, bracket 752 may gradually retain its prior shape (e.g., hand portion 762 may retain its prior shape) such that bracket 752 may support switch 320 (e.g., similar to how bracket 752 may support each one of switches 310 and 330).

In other embodiments, rather than changing a shape of a single bracket 752 to accommodate structural post 152, separate first and second brackets 752 may be employed. For example, a first bracket 752 may be employed to secure switch 320, and a second bracket 752 may be employed to secure one or more of switches 310 and 330. For example, the first bracket 752 may extend at least from line V3 to line V4 of FIG. 11, and the second bracket 752 may extend at least from line V1 to line V2 of FIG. 11. Each surface 752m of the first bracket 752 and the second bracket 752 may be secured to a corresponding portion of housing 101. In this manner, each one of switches 310, 320, and 330 may be secured in their respective locations within housing 101. Moreover, in these embodiments, the first bracket 752 and the second bracket 752 may further couple or adjoin to each other at one or more points beyond structural post 152 (e.g., beyond the predefined distance k from external surface 101e of housing 101).

In some embodiments, although a thickness 752t of bracket 752 may be equal to or larger than a width 176d of opening 176, thickness 752t may be less than a width 174d of opening 174. Thus, even if at least one portion of surface 752m of bracket 752 may be secured to housing 101 (e.g., as described above), hand portion 762 of bracket 752 may still be able to move in at least the ±Z-directions with respect to housing 101. Thus, additionally or alternatively, electronic device 100 may include one or more gaskets 852 and 854 that may be configured to couple bracket 752 with housing 101. Gasket 852 may be similar to gasket 854, and may be composed of any suitable material (e.g., silicone, elastomer (e.g., urethane), etc.). As shown in FIG. 14, for example, gasket 852 may be configured to fit (e.g., snug fit) between a portion of wall 754 and a corresponding portion of surface 101p of housing 101. Similarly, gasket 854 may be configured to fit (e.g., snug fit) between a portion of wall 756 and a corresponding portion of surface 101q of housing 101. In this manner, hand portion 762 of bracket 752 may be at least partially restricted from movement in the ±Z-directions within housing 101.

Although FIG. 14 may only show a portion of each one of gasket 852 and 854, it should be appreciated that each one of gasket 852 and 854 may extend in the ±Y-directions. For example, each one of gasket 852 and 854 may extend in the ±Y-directions at least as much as bracket 752 may extend in the ±Y-directions. In some embodiments (e.g., in the embodiments described above, where a first bracket 752 may be employed to secure switch 320, and a second bracket 752 may be employed to secure switches 310 and 330), corresponding first gaskets 852 and 854 and second gaskets 852 and 854 may be employed. Moreover, in some embodiments, gaskets 852 and 854 may not be separate components, but may instead be a single gasket unit. For example, the single gasket unit may line at least a portion of the perimeter of one or more of openings 172 and 174. Thus, in the embodiments described above (e.g., where a first bracket 752 may be employed to secure switch 320 and a second bracket 752 may be employed to secure switches 310 and 330), electronic device 100 may include a first single gasket unit that may line at least a portion of the perimeter of opening 172 to secure arm portion 762 of the first bracket 752 to housing 101. Similarly, electronic device 100 may also include a second single gasket unit that may line at least a portion of the perimeter of opening 174 to secure arm portion 762 of the second bracket 752 to housing 101.

As described above with respect to FIGS. 5 and 6, when button assembly 200 is integrated with electronic device 100, each one of limbs 212, 222, 232, and 234, and thus each one of feet 212*f*, 222*f*, 232*f*, and 234*f*, of button assembly 200 may be free to move at least a predetermined distance in the +X-direction (e.g., to allow movement of a corresponding one of regions 210, 220, and 230, when an external force is applied to that region in the +X-direction). As also described above with respect to FIGS. 5 and 6, housing 101 may include a respective space 101*s* that may be positioned directly adjacent a corresponding one of wall portions 101*w*1-101*w*4, such that each one of limbs 212, 222, 232, and 234 may be free to move away from a corresponding one of wall portions 101*w*1-101*w*4 and farther into electronic device 100. In some embodiments, each space 101*s* may be disposed between a respective one of limbs 212, 222, 232, and 234 and a corresponding portion of either one of gasket 852 and 854 or a corresponding portion of a single gasket unit, if a single gasket as described above is employed). In these embodiments, although each one of limbs 212, 222, 232, and 234 may be free to move away from a corresponding one of wall portions 101*w*1-101*w*4 and farther into electronic device 100 (e.g., when an external force is applied to a corresponding region of button assembly 200 in the +X-direction), a corresponding portion of gasket 650 may provide a rebound or spring force that may push a corresponding limb back towards a corresponding wall. That is, although button assembly 200 may be configured to automatically return to its natural state after an applied external force is removed (e.g., from any one of regions 210, 220, and 230), the gasket may further ensure that each region of button assembly 200 may return to its respective natural state.

As described above with respect to FIGS. 5 and 6, for example, housing 101 may include structural post 152 that may be positioned a predefined distance k from external surface 101*e*. Additionally or alternatively, housing 101 may include a structural post (e.g., that may be similar to structural post 152) at one or more other locations within housing 101. For example, in some embodiments, housing 101 may include a structural post that may extend from surface 101*p* (e.g., similar to how structural post 152 may extend from surface 101*p*), and that may be positioned any suitable distance from the position of structural post 152 in the ±Y-direction. Moreover, in some embodiments, housing 101 may not include any structural posts at all. In these embodiments, housing 101 may be constructed to be sufficiently stable, such that any structural post (e.g., structural 152) may not provide any further structural stability to housing 101 adjacent external opening 176.

Although FIG. 14 may show switch 320 disposed between shim 650 and circuit board 530, in some embodiments, circuit board 530 may instead be sandwiched between button assembly 200" and shim 650. In these embodiments, for example, shim 650 may be coupled to hand portion 762 of bracket 752, and switch 320 may be oriented such that activator surface 324*f* may face the +X-direction. In this manner, when end region 220 is depressed in the +X-direction, internal surface 220*i* may depress circuit board 530, which may, in turn, depress activator surface 324*f* onto shim 650 to activate switch 320.

Figure 15A:
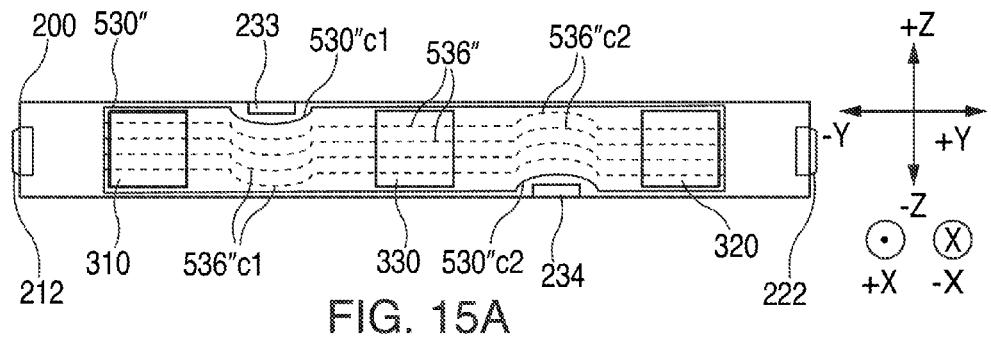
FIG. 15A is a view of the button assembly of FIGS. 10-14 and the set of switches of FIGS. 4A-6 and 9, taken from line XVA-XVA of FIG. 10, in accordance with some embodiments of the invention.

In some embodiments, button assembly 200" may be integrated with electronic device 100. As shown in FIG. 15A, for example, circuit board 530" may be coupled to each one of switches 310, 320, and 330 (e.g., via a set of electrical traces 536"), and may extend in the ±Y-directions. Because circuit board 530" may be disposed adjacent to button assembly 200" in the +X-direction, and because the protrusion of each one of limbs 233 and 234 in the +X-direction may at least partially interfere with the extension of circuit board 530" in the ±Z directions, circuit board 530" may, for example, be shaped to accommodate each one of limbs 233 and 234 to avoid such contact with limbs 233 and 234. As shown in FIG. 15A, for example, circuit board 530" may include a curved portion 530"*c*1 and a curved portion 530"*c*2. Curved portion 530"*c*1 may curve towards the −Z-direction, and curved portion 530"*c*2 may curve towards the +Z-direction such that limbs 233 and 234, respectively, may be prevented from contacting and/or interfering with circuit board 530". However, because curved portions 530"*c*1 and 530"*c*2 may result in at least a partial decrease in size of circuit board 530" (e.g., in the Z-axis), the set of traces 536" may also be arranged to accommodate this decrease in size. For example, each one of electrical traces 536" may include a curved trace portion 536"*c*1, that may be curved similarly as curved portion 530"*c*1 (e.g., in the −Z-direction), to accommodate curved portion 530"*c*1. Moreover, each one of electrical traces 536" may also include a curved trace portion 536"*c*2, that may be curved similarly as curved portion 530"*c*2 (e.g., in the +Z-direction), to accommodate curved portion 530"*c*2.

Figure 15B:
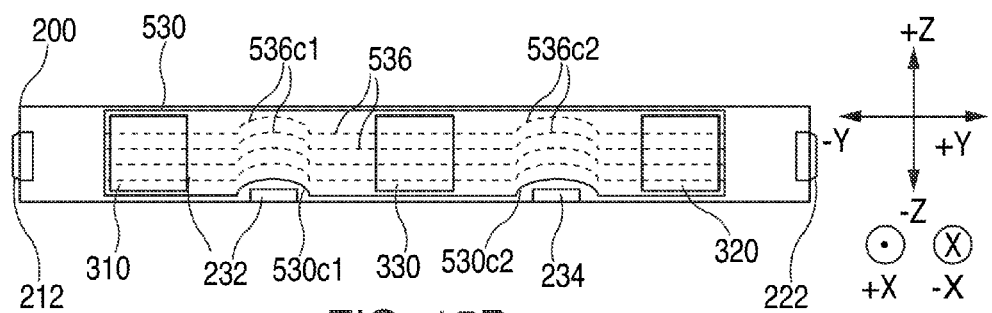
FIG. 15B is a view of the button assembly of FIGS. 2A-4A and 5-7 and the set of switches of FIGS. 4A-6 and 9, taken from line XVB-XVB of FIG. 4A, in accordance with some embodiments of the invention.

In some embodiments, button assembly 200 may be integrated with electronic device 100. As shown in FIG. 15B, for example, circuit board 530 may also be coupled to each one of switches 310, 320, and 330 (e.g., via a set of electrical traces 536), and may also extend in the ±Y-directions (e.g., similar to circuit board 530" of FIG. 15A). Because circuit board 530 may be disposed adjacent to button assembly 200 in the +X-direction, and because the protrusion of each one of limbs 232 and 234 in the +X-direction may at least partially interfere with the extension of circuit board 530 in the ±Z directions, circuit board 530 may, for example, be shaped to accommodate each one of limbs 232 and 234 to avoid such contact with limbs 232 and 234. As shown in FIG. 15B, for example, circuit board 530 may include a curved portion 530*c*1 and a curved portion 530*c*2. Curved portions 530*c*1 and 530*c*2 may curve towards the +Z-direction (e.g., similar to curved portion 530"*c*2 of FIG. 15A) such that limbs 232 and 234, respectively, may be prevented from contacting and/or interfering with circuit board 530. However, because curved portions 530*c*1 and 530*c*2 may result in at least a partial decrease in size of circuit board 530 (e.g., in the Z-axis), the set of traces 536 may also be arranged to accommodate this decrease in size (e.g., similar to the set of traces 536" of FIG. 15A). For example, each one of electrical traces 536 may include a curved trace portion 536*c*1, that may be curved similarly as curved portion 530*c*1 (e.g., in the +Z-direction), to accommodate curved portion 530*c*1. Moreover, each one of electrical traces 536 may also include a curved trace portion 536*c*2, that may be curved similarly as curved portion 530*c*2 (e.g., in the +Z-direction), to accommodate curved portion 530*c*2.

Figure 15C:
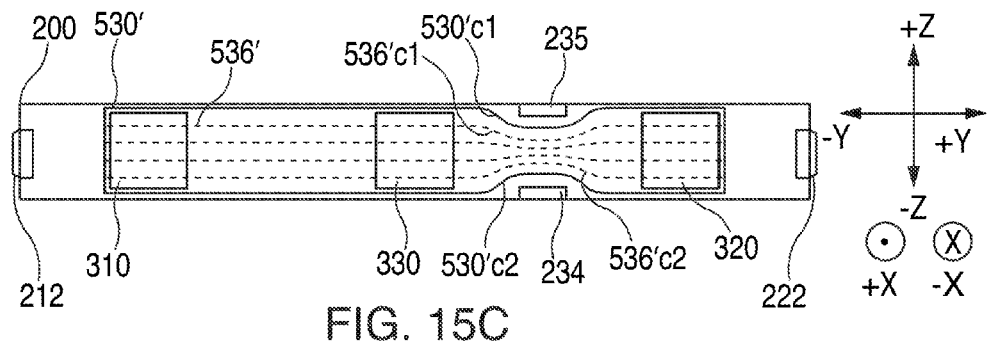
FIG. 15C is a view of the button assembly of FIGS. 8 and 9 and the set of switches of FIGS. 4A-6 and 9, taken from line XVC-XVC of FIG. 8, in accordance with some embodiments of the invention.

In some embodiments, button assembly 200' may be integrated with electronic device 100. As shown in FIG. 15C, for example, circuit board 530' may also be coupled to each one of switches 310, 320, and 330 (e.g., via a set of electrical traces 536'), and may also extend in the ±Y-directions (e.g., similar to circuit board 530" of FIG. 15A and circuit board 530 of FIG. 15B). Because circuit board 530' may be disposed adjacent to button assembly 200' in the +X-direction, and because the protrusion of each one of limbs 234 and 235 in the ±Z-directions may at least partially interfere with the extension of circuit board 530' in the ±Z directions, circuit board 530' may, for example, be shaped to accommodate each one of limbs 234 and 235 to avoid such contact with limbs 234 and 235. As shown in FIG. 15C, for example, circuit board 530' may include a curved portion 530'c1 and a curved portion 530'c2. Curved portions 530'c1 and 530'c2 may curve towards the −Z-direction and +Z-direction, respectively, such that limbs 234 and 235 may be prevented from contacting and/or interfering with circuit board 530'. However, because curved portions 530'c1 and 530'c2 may result in at least a partial decrease in size of circuit board 530 (e.g., in the Z-axis), the set of traces 536' may also be arranged to accommodate this decrease in size (e.g., similar to the set of traces 536'' of FIG. 15A and the set of traces 536 of FIG. 15B). For example, electrical traces 536' may include at least one curved trace portion 536'c1, that may be curved similarly as curved portion 530'c1 (e.g., in the −Z-direction), to accommodate curved portion 530'c1. Moreover, electrical traces 536' may also include at least one curved trace portion 536'c2, that may be curved similarly as curved portion 530'c2 (e.g., in the +Z-direction), to accommodate curved portion 530'c2.

It should be appreciated that the size and shape of each button assembly, center region, end region, limb, bracket, and gasket may vary based on different factors, such as the size and shape of the housing of electronic device 100, the size and shape of various electronic components within electronic device 100, and the like.

Figure 16:
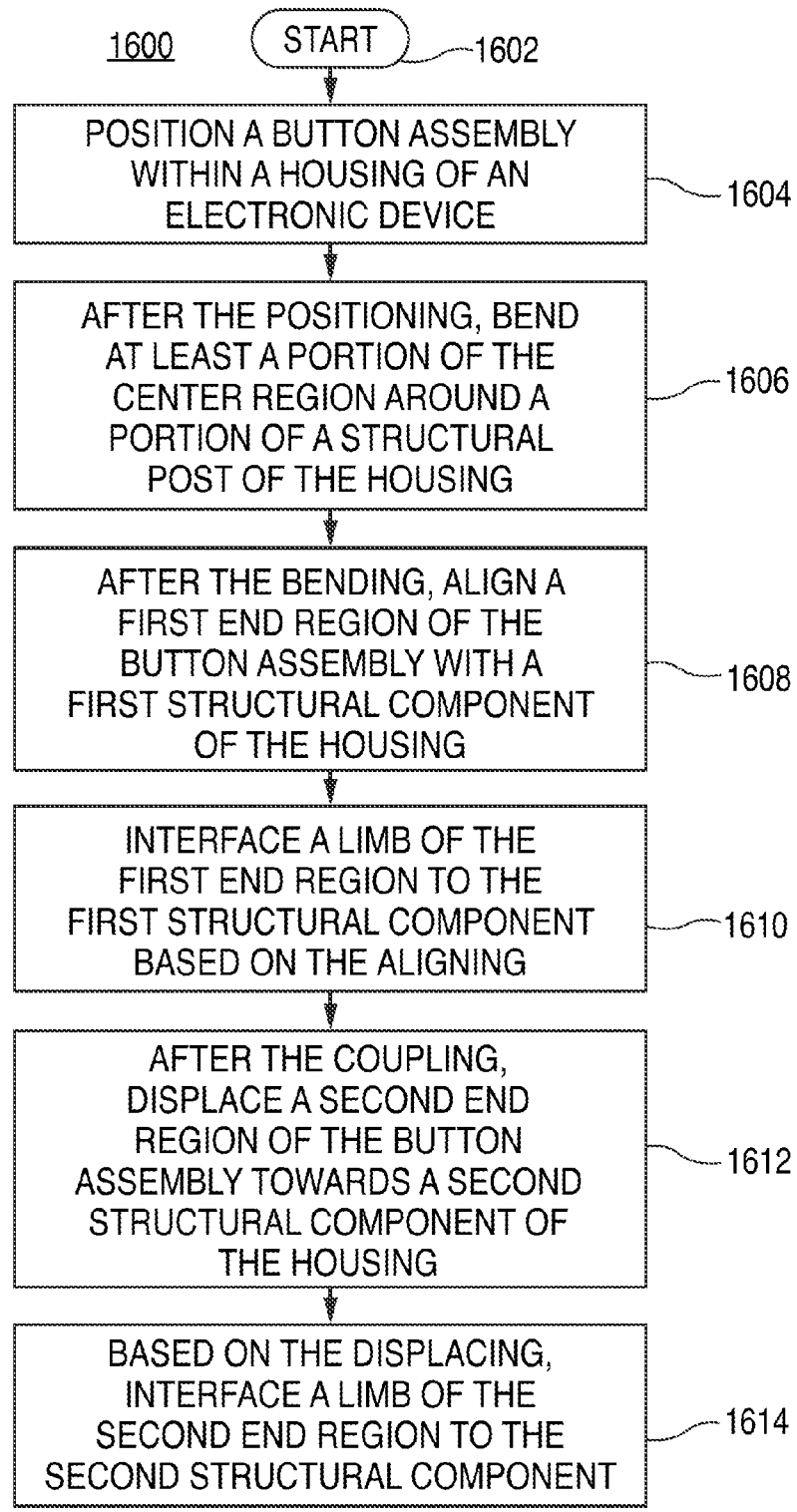
FIG. 16 is a flowchart of an illustrative process for integrating a button assembly with an electronic device, in accordance with some embodiments of the invention.

FIG. 16 is a flowchart of an illustrative process 1600 for integrating a button assembly (e.g., button assembly 200) with an electronic device (e.g., electronic device 100).

Process 1600 may begin at step 1602. At step 1604, process 1600 may include positioning a button assembly within a housing of an electronic device. For example, button assembly 200 may be positioned within housing 101 of electronic device 100 (e.g., while the portion of housing 101 shown in FIGS. 5 and 6 is made accessible). In particular, the button assembly may be oriented such that a front surface of the button assembly may face a direction that points away from the housing (e.g., out through external opening 176). For example, button assembly 200 may be positioned within housing 101 such that each one of surfaces 210f, 220f, and 230f may face the −X-direction out through external opening 176.

After the positioning, at step 1606, process 1600 may include bending at least a portion of the center region around a portion of a structural post of the housing. For example, a portion of center region 230 may be bent around structural post 152. In particular, the flexible configuration of center region 230 may allow button assembly 200 to bend.

After the bending, at step 1608, process 1600 may include aligning a first end region of the button assembly with a first structural component of the housing. For example, end region 220 of button assembly 200 may be aligned with a portion of housing 101 that may include wall portion 101w4.

At step 1610, process 1600 may include interfacing a limb of the first end region to the first structural component based on the aligning. For example, foot 222f of limb 222 may be interfaced with wall portion 101w4.

After the coupling, at step 1612, process 1600 may include displacing a second end region of the button assembly towards a second structural component of the housing. For example, end region 210 of button assembly 200 may be displaced towards wall portion 101w1 of housing 101.

Based on the displacing, at step 1614, process 1600 may include interfacing a limb of the second end region to the second structural component. For example, foot 212f of limb 212 may be interfaced with wall portion 101w1.

It is to be understood that the steps shown in FIG. 16 are merely illustrative and that existing steps may be modified, added, or omitted.

While there have been described systems and methods for providing inputs to an electronic device with a button assembly, it is to be understood that many changes may be made therein without departing from the spirit and scope of the invention. It is also to be understood that various directional and orientational terms such as "up" and "down," "left" and "right," "top" and "bottom," "X", "Y", and "Z," and the like are used herein only for convenience, and that no fixed or absolute directional or orientational limitations are intended by the use of these words. For example, the devices and/or assemblies of the invention can have any desired orientation. If reoriented, different directional or orientational terms may need to be used in their description, but that will not alter their fundamental nature as within the scope and spirit of the invention. Those skilled in the art will appreciate that the invention can be practiced by other than the described embodiments, which are presented for purposes of illustration rather than of limitation, and the invention is limited only by the claims which follow.

What is claimed is:

1. A button assembly comprising:
a button having an exposed surface configured to receive user input and comprising:
a center region positioned over a center switch;
a first end region extending from a first side of the center region and positioned over a first end switch; and
a second end region extending from a second side of the center region and positioned over a second end switch, wherein:
the button is configured to flex to provide independent actuation of the center switch, the first end switch, and the second end switch.

2. The button of claim 1, wherein the center region, the first end region, and the second end region form a single contiguous portion of the button assembly.

3. The button assembly of claim 1, wherein at least one of:
a thickness of the button assembly varies from the center region to at least one of the first end region and the second end region; and
a flexibility of the button assembly varies continuously from the center region to at least one of the first end region and the second end region.

4. The button of claim 1, wherein:
each one of the first end region and the second end region comprises a first thickness; and
the center region comprises a second thickness that is less than the first thickness.

5. The button assembly of claim 1, wherein:
the center region comprises:
a first surface that faces a first direction; and
a second surface that faces a second direction that is opposite the first direction;
at least a portion of the first surface is flat; and
at least a portion of the second surface comprises a curve.

6. The button assembly of claim 1, wherein each one of the first end region, the second end region, and the center region comprises at least one limb configured to couple the button to a corresponding portion of an electronic device.

7. An electronic device comprising:
a housing;
a group of three or more switches disposed within the housing; and
a button positioned to interact with a portion of the housing and comprising a group of three or more regions, wherein each region of the group of regions is positioned adjacent to a respective switch of the group of switches, and wherein the button is configured to:

flex in a first manner to cause an end of the button to move up when an external force is applied to a first region; and flex in a second manner to cause the end of the button to move down when the external force is applied to the second region.

8. The electronic device of claim 7, wherein the first region is disposed between the second region and a third region of the group of regions.

9. The electronic device of claim 8, wherein the button is configured to flex in the first manner by: moving the first region towards the respective switch that is positioned adjacent to the first region; and moving each one of the second region and the third region away from the respective switch that is positioned adjacent to that region.

10. The electronic device of claim 8, wherein the button is configured to flex in the second manner by:

moving the second region towards the respective switch that is positioned adjacent to the second region; and moving the first region towards the respective switch that is positioned adjacent to the first region such that a portion of that respective switch pivots the button at the first region.

11. The electronic device of claim 10, wherein:

the moving the first region comprises moving the first region by a first amount; and the moving the second region comprises moving the second region by a second amount that is greater than the first amount.

12. The electronic device of claim 8, wherein each one of the second region and the third region comprises at least one limb configured to interact with a corresponding structural component of the portion of the housing.

13. The electronic device of claim 12, wherein the first region comprises a first limb configured to interact with a corresponding structural component of the portion of the housing, and wherein, when the button flexes in the first manner:

the at least one limb of the first region moves away from the corresponding structural component; and a strength of the interaction of each one of the at least one limb of the second region and the at least one limb of the third region to the corresponding structural components is increased.

14. The electronic device of claim 12, wherein, when the button flexes in the second manner, a strength of the interaction of the second region to the corresponding structural component is decreased.

15. An electronic device comprising:

a group of three or more switches;

a button disposed over the group of switches and comprising a group of three or more regions; and a shim disposed between a portion of the button and a respective switch of the group of switches, wherein:

the shim is: coupled to the portion of the button via a first adhesive member;

and coupled to the portion of the center switch via a second adhesive member;

each region of the group of regions of the button is positioned adjacent to a respective switch of the group of switches;

the button is configured to bend in a first manner when an external force is applied to a first region of the group of regions proximate to the portion causing an end of the button to move up; and the button is configured to bend in a second manner when the external force is applied to a second region of the group of regions causing the end of the button to move down.

16. The electronic device of claim 15, wherein the coupling of the shim to the portion of the button allows simultaneous movement of at least the portion of the button and at least the portion of the switch in a first direction.

17. The electronic device of claim 16, wherein the coupling of the shim to the portion of the switch prevents any movement of the portion of the button with respect to the portion of the switch in a second direction that is orthogonal to the first direction.

18. The electronic device of claim 15, wherein:

the switch comprises a depressable activator; and the portion of the switch comprises the depressable activator.

19. The electronic device of claim 15 further comprising a housing, wherein: the button comprises at least one limb; and the button is coupled to a portion of the housing via the at least one limb.

20. An electronic device comprising:

a housing;

a button positioned within an opening of the housing;

a bracket comprising an arm portion and a hand portion; and multiple switches residing on the hand portion and disposed adjacent to the button, wherein:

the hand portion comprises a recess configured to prevent a corresponding switch of the multiple switches from moving away from the button in a first direction;

the button disposed over the multiple switches and comprises multiple regions;

each region of the multiple regions is positioned adjacent to a respective switch of the multiple switches; and wherein the button is configured to:

cause an end of the button to bend toward the hand portion when an external force is applied to a first region of the multiple regions; and cause the end of the button to bend away from the hand portion when the external force is applied to a second region of the multiple regions.

21. The electronic device of claim 20, wherein the arm portion is coupled to at least a portion of the housing.

22. The electronic device of claim 20, wherein the housing comprises a structural post disposed adjacent to the portion of the housing.

23. The electronic device of claim 20, wherein:

a portion of the hand portion that is positioned adjacent to the structural post comprises a curved surface configured to accommodate a shape of the structural post.

24. The electronic device of claim 20 further comprising a gasket disposed between a portion of the bracket and the portion of the housing.

25. The electronic device of claim 24, wherein:

the portion of the housing comprises a group of structural components;

the button comprises a group of limbs;

each limb of the group of limbs is configured to interact with a corresponding structural component of the group of structural components; and each limb of the group of limbs is configured to move towards and contact a portion of the gasket when an external force is applied to a region of the button that is associated with that limb.

26. The electronic device of claim 25, wherein the gasket is configured to prevent that limb from moving beyond a predetermined distance within the housing when the external force is applied.

27. An electronic device comprising:
a housing;
a group of switches disposed within the housing; and
a button positioned to interact with a portion of the housing and comprising a group of regions, wherein:
   each region of the group of regions is positioned adjacent to a respective switch of the group of switches; and
   when an external force is applied to a first region between a second and a third region, the button is configured to flex and move the first region toward a respective switch that is positioned adjacent to the first region and flex and move a first and second end corresponding to the second and third regions away from the respective adjacent switches.

28. An electronic device comprising:
a housing;
a group of switches disposed within the housing; and
a button positioned to interact with a portion of the housing and comprising a group of regions, wherein each region of the group of regions is positioned adjacent to a respective switch of the group of switches, and wherein:
   the button is configured to bend in response to an external force;
   an end the button is configured move in a first direction with respect to the group of switches when the external force is applied to the first region; and
   the end is configured to move in a second direction with respect to the group of switches when the external force is applied to a second region proximate to the end of the button.

29. The electronic device of claim 28, wherein each one of the second region and the third region comprises at least one limb configured to interact with a corresponding structural component of the portion of the housing.

30. The electronic device of claim 29, wherein the first region comprises a first limb configured to interact with a corresponding structural component of the portion of the housing, and wherein, when the button moves in a first manner:
   the at least one limb of the first region moves away from the corresponding structural component; and
   a strength of the interaction of each one of the at least one limb of the second region and the at least one limb of the third region to the corresponding structural components is increased.

* * * * *